(12) United States Patent
Ito et al.

(10) Patent No.: US 11,283,993 B2
(45) Date of Patent: Mar. 22, 2022

(54) IMAGE-CAPTURING APPARATUS, IMAGE-CAPTURING METHOD, AND IMAGE-CAPTURING DEVICE

(71) Applicant: SONY CORPORATION, Tokyo (JP)

(72) Inventors: Atsushi Ito, Kanagawa (JP); Ilya Reshetouski, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/954,015

(22) PCT Filed: Dec. 7, 2018

(86) PCT No.: PCT/JP2018/045019
§ 371 (c)(1),
(2) Date: Jun. 15, 2020

(87) PCT Pub. No.: WO2019/124106
PCT Pub. Date: Jun. 27, 2019

(65) Prior Publication Data
US 2021/0084219 A1 Mar. 18, 2021

(30) Foreign Application Priority Data
Dec. 22, 2017 (JP) .............................. JP2017-246393

(51) Int. Cl.
*H04N 5/232* (2006.01)
*H04N 5/341* (2011.01)

(52) U.S. Cl.
CPC ......... *H04N 5/23229* (2013.01); *H04N 5/341* (2013.01)

(58) Field of Classification Search
None
See application file for complete search history.

(56) References Cited

U.S. PATENT DOCUMENTS 8,744,200 B1* 6/2014 Owechko ........... G06K 9/00496
382/232
9,485,393 B2* 11/2016 Iwai ................... H04N 5/23229
(Continued)

FOREIGN PATENT DOCUMENTS

CN 105008969 A 10/2015

OTHER PUBLICATIONS

Yuan et al., Block-Wise Lensless Compressive Camera, arXiv.org, Jan. 19, 2017, pp. 1-5.
(Continued)

*Primary Examiner* — James M Hannett
(74) *Attorney, Agent, or Firm* — Paratus Law Group, PLLC

(57) ABSTRACT

The present disclosure relates to an image-capturing apparatus, an image-capturing method, and an image-capturing device that allow reduction of an influence of diffraction due to opening sections of a mask in lensless image-capturing. Before a mask, a band-pass filter that is divided into a plurality of areas, each of which transmits incident light in a different wavelength band, is provided, and the mask that includes opening sections, and modulates the incident light, which has been transmitted through the band-pass filter, in the wavelength bands that are different for the individual areas is provided. The opening sections of the mask have such unit sizes that blurring resulting from diffraction which occurs to each wavelength of the incident light is minimized. The present disclosure can be applied to a lensless image-capturing apparatus.

17 Claims, 11 Drawing Sheets

(56) References Cited

U.S. PATENT DOCUMENTS

| | | | |
|---|---|---|---|
| 2013/0340543 A1* | 12/2013 | Farahi | H04N 5/378 73/866.1 |
| 2014/0211039 A1* | 7/2014 | Herman | G06T 9/00 348/222.1 |
| 2014/0253781 A1* | 9/2014 | Gill | G02B 5/1871 348/335 |
| 2015/0215529 A1* | 7/2015 | Wang | H04N 5/23229 348/218.1 |
| 2016/0003994 A1* | 1/2016 | Gill | H01L 27/14685 348/218.1 |
| 2017/0031065 A1 | 2/2017 | Wu et al. | |

OTHER PUBLICATIONS

Asif et al., FlatCam: Thin, Bare-Sensor Cameras using Coded Aperture and Computation, arXiv.org, Sep. 1, 2015, pp. 1-12.
Fu et al., Compressive Spectral Imaging via Polar Coded Aperture, IEEE Transactions on Computational Imaging, Oct. 13, 2016, pp. 408-420, vol. 3, No. 3, IEEE.
Wang et al., Computational multi-spectral video imaging, arXiv.org, May 25, 2017, pp. 1-42.

* cited by examiner

FIG.11
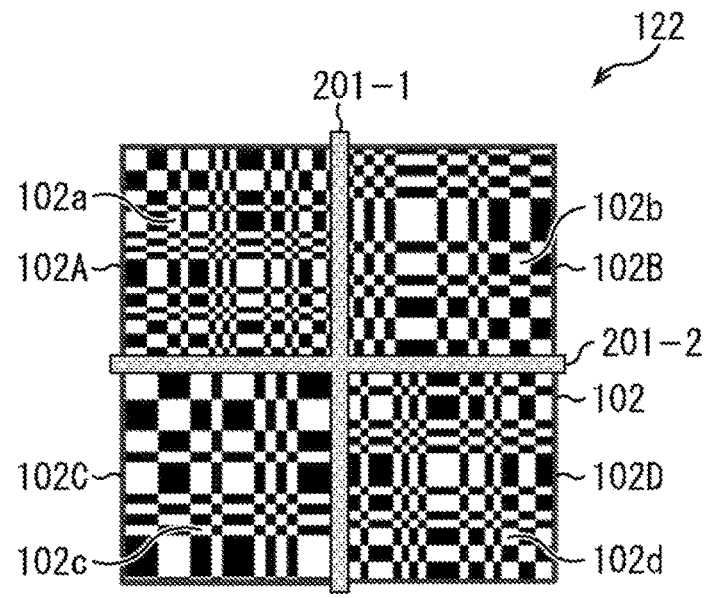
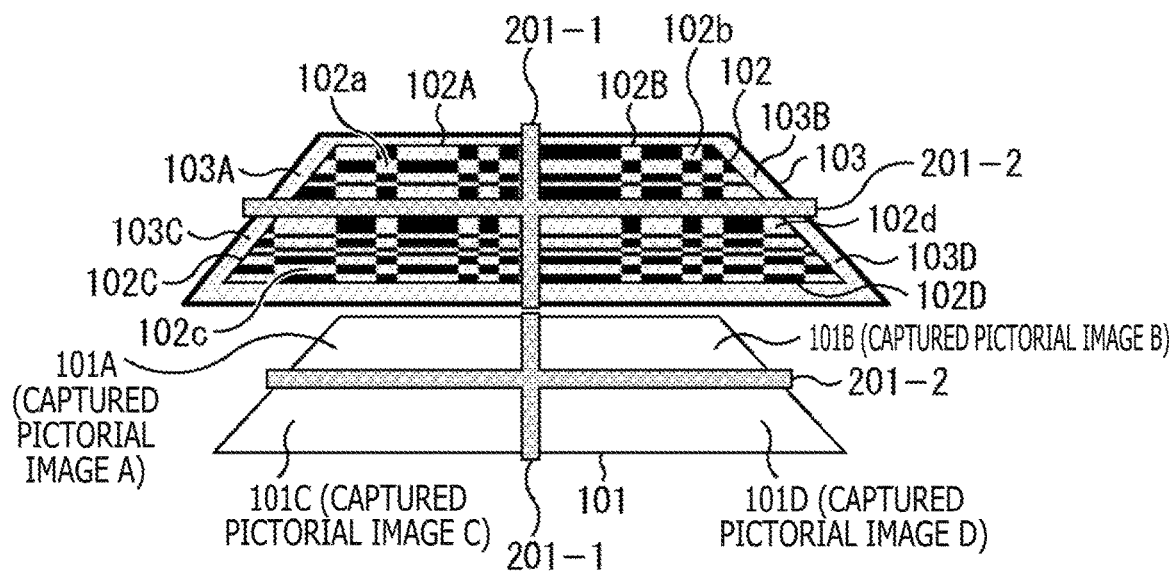

IMAGE-CAPTURING APPARATUS, IMAGE-CAPTURING METHOD, AND IMAGE-CAPTURING DEVICE

CROSS REFERENCE TO PRIOR APPLICATION

This application is a National Stage Patent Application of PCT International Patent Application No. PCT/JP2018/045019 (filed on Dec. 7, 2018) under 35 U.S.C. § 371, which claims priority to Japanese Patent Application No. 2017-246393 (filed on Dec. 22, 2017), which are all hereby incorporated by reference in their entirety.

TECHNICAL FIELD

The present disclosure relates to an image-capturing apparatus, an image-capturing method, and an image-capturing device, and in particular relates to an image-capturing apparatus, an image-capturing method, and an image-capturing device that allow capturing of two-dimensional pictorial images with high spatial resolutions as final pictorial images even in a case that a wide range of wavelengths is acquired simultaneously in a lensless image-capturing apparatus.

BACKGROUND ART

A lensless image-capturing apparatus is an image-capturing apparatus that captures images by using a light-modulating mechanism such as patterned openings or a diffraction grating along with a two-dimensional pictorial image sensor, without using lenses that have been used in existing two-dimensional pictorial image-capturing systems, and performs signal processing on pixel signals after capturing the images to reconstruct the pixel signals into a two-dimensional final pictorial image, thereby realizing size-reduction, weight-reduction, price-reduction, non-planarization and the like of image-capturing apparatuses.

There are several techniques for the configurations of lensless image-capturing apparatuses.

For example, in one technique that has been proposed the followings: light entering an image-capturing plane of a two-dimensional pictorial image sensor is modulated by patterned mask openings; on the basis of the modulated light, a pictorial image is captured; and a final pictorial image is reconstructed by performing signal processing on the captured pictorial image (see PTL 1).

In addition, in another technique that has been proposed the followings: light entering an image-capturing plane of a two-dimensional pictorial image sensor is controlled by Fresnel structure mask openings; and a final pictorial image is reconstructed by performing Fourier transform-based signal processing (see NPL 1).

Furthermore, in a still another technique that has been proposed the followings: incident light is modulated into sine wave-like forms having different phases depending on the angles of the incident light by using a diffraction grating; the incident light is captures by a two-dimensional pictorial image sensor; and a final pictorial image is restored by reconstructing the captured image by signal processing (see PTL 2).

CITATION LIST

Patent Literature

[PTL 1]
WO2016/123529A1
[PTL 2]
JP 2016-510910A (US 2016003994)

Non Patent Literature

[NPL 1]
Lensless Light-field Imaging with Fresnel Zone Aperture (Yusuke Nakamura, Takeshi Shimano, Kazuyuki Tajima, Mayu Sao, Taku Hoshizawa (Hitachi, Ltd.)), IWISS2016

SUMMARY

Technical Problems

It is claimed that all the techniques described in PTL 1, PTL 2, and NPL 1 mentioned above are scalable approaches that can cope with the wavelengths of incident light to be input. Certainly, lensless image-capturing apparatuses are a technology that can be applied also to image-capturing of X ray and γ rays, and have been used also for astronomical pictorial image observation. Theoretically, lensless image-capturing apparatuses can be applied also to millimeter-wave or terahertz-wave imaging.

However, if optical diffraction phenomena are taken into consideration, patterns, shapes and the like of openings that modulate light in each of the techniques need to be optimized for wavelengths of interest. This is because diffraction is a phenomenon that depends on the wavelengths of incident light.

For example, in the technique of PTL 1, there is a fear that unless a distance between a pattern mask and a pictorial image sensor or sizes of the unit patterns of openings are optimized for wavelengths of interest, the amount of blurring due to diffraction increases.

In addition, the technique of NPL 1 is thought to be more susceptible to the influence of diffraction, and there is a fear that unless the modulation cycle of the transmittance of a mask is optimized for wavelengths of interest, mutual interference due to diffraction occurs.

Furthermore, since the technique of PTL 2 makes use of diffraction itself, light that reaches a sensor exhibits different behavior depending on wavelengths. There is a fear that unless lattice intervals are designed to attain phases suited for wavelengths of interest, light spreads inevitably, and, as a natural consequence, spatial blurring occurs in a pictorial image.

As described above, in any of the techniques, in a case that a wide range of wavelengths is acquired simultaneously, there is a fear that the spatial resolution of a two-dimensional pictorial image to be reconstructed as a final pictorial image is lowered.

The present disclosure has been made in view of such situations, and in particular aims to make it possible to reconstruct and restore two-dimensional pictorial images with high spatial resolutions as final pictorial images even in a case that a wide range of wavelengths is acquired simultaneously in a lensless image-capturing apparatus.

Solution to Problems

An image-capturing apparatus according to one aspect of the present disclosure is an image-capturing apparatus including: a band-pass filter that is divided into a plurality of areas, each of which transmits incident light in a different wavelength band; a mask that is divided corresponding to the plurality of areas, and modulates the incident light in the different wavelength bands that are each transmitted through a corresponding one of the plurality of areas of the band-pass filter; a solid-state image-capturing device that has an image-capturing plane that is divided corresponding to the plurality of areas, and captures, as a two-dimensional pixel signal, the incident light modulated by the mask in each of the plurality of areas; and a signal processing section that reconstructs, as a final pictorial image by signal processing, the two-dimensional pixel signals captured by the solid-state image-capturing device.

The mask may have a mask pattern having a unit size that is different for each of the plurality of areas.

The mask pattern for each of the plurality of areas may be a mask pattern having a different unit size that is based on the wavelength band of the incident light that is transmitted through the band-pass filter.

The mask pattern for each of the plurality of areas may be a mask pattern having such a unit size that when the incident light in the wavelength band that is transmitted through the band-pass filter is captured by the solid-state image-capturing device, spreading of the incident light due to diffraction is approximately minimized.

A distance from the mask to the image-capturing plane of the solid-state image-capturing device may differ for each of the plurality of areas.

The distance from the mask to the image-capturing plane of the solid-state image-capturing device may be a distance that differs on a basis of the wavelength band of the incident light that is transmitted through each of the plurality of areas of the band-pass filter.

The distance from the mask to the image-capturing plane of the solid-state image-capturing device for each of the plurality of areas may be such a distance that when the incident light in the wavelength band that is transmitted through the band-pass filter is captured by the solid-state image-capturing device, spreading of the incident light due to diffraction is approximately minimized.

The mask may have a mask pattern having identical unit sizes for all areas of the plurality of areas.

A light-blocking wall that blocks incident light from adjacent areas may further be included at a boundary between the plurality of areas of the band-pass filter, the mask, and the solid-state image-capturing device.

The signal processing section may include: a dividing section that divides a two-dimensional pixel signal captured by the solid-state image-capturing device in association with the plurality of areas; a plurality of pictorial-image reconstructing sections that reconstructs, as a final pictorial image by signal processing, each of pixel signals obtained by dividing the two-dimensional pixel signal; and a synthesizing section that synthesizes the final pictorial images reconstructed by the plurality of pictorial-image reconstructing sections.

The synthesizing section may synthesize the final pictorial images reconstructed by the plurality of pictorial-image reconstructing sections by superimposing the final pictorial images.

By selecting one final pictorial image of the final pictorial images reconstructed by the plurality of pictorial-image reconstructing sections, the synthesizing section may synthesize the one final pictorial image.

The synthesizing section may select at least two final pictorial images of the final pictorial images reconstructed by the plurality of pictorial-image reconstructing sections, and synthesize the selected at least two final pictorial images in such a manner that the selected at least two final pictorial images are superimposed.

A minute gap may be formed in a direction of incidence of the incident light between the solid-state image-capturing device and the mask.

The image-capturing apparatus may have a configuration not including a lens that focuses the incident light onto any of the band-pass filter, the mask, and the solid-state image-capturing device.

The wavelength bands of the incident light may be approximately 8 μm to approximately 14 μm.

An image-capturing method according to one aspect of the present disclosure is an image-capturing method of an image-capturing apparatus including: a band-pass filter that is divided into a plurality of areas, each of which transmits incident light in a different wavelength band; a mask that is divided corresponding to the plurality of areas, and modulates the incident light in the different wavelength bands that are each transmitted through a corresponding one of the plurality of areas of the band-pass filter; and a solid-state image-capturing device that has an image-capturing plane that is divided corresponding to the plurality of areas, and captures, as a two-dimensional pixel signal, the incident light modulated by the mask in each of the plurality of areas. The image-capturing method includes signal processing of reconstructing, as a final pictorial image by signal processing, the two-dimensional pixel signals captured by the solid-state image-capturing device.

An image-capturing device of according to one aspect of the present disclosure is an image-capturing device including: a band-pass filter that is divided into a plurality of areas, each of which transmits incident light in a different wavelength band; a mask that is divided corresponding to the plurality of areas, and modulates the incident light in the different wavelength bands that are each transmitted through a corresponding one of the plurality of areas of the band-pass filter; and a solid-state image-capturing device that has an image-capturing plane that is divided corresponding to the plurality of areas, and captures, as a two-dimensional pixel signal, the incident light modulated by the mask in each of the plurality of areas.

Advantageous Effect of Invention

According to one aspect of the present disclosure, in particular, even in a case that a wide range of wavelengths is acquired simultaneously in a lensless image-capturing apparatus, two-dimensional pictorial images with high spatial resolutions can be reconstructed, and restored as final pictorial images.

BRIEF DESCRIPTION OF DRAWINGS

FIG. 11 is a diagram for explaining a configuration example of a third embodiment of the present disclosure.

DESCRIPTION OF EMBODIMENTS

Hereinafter, suitable embodiments of the present disclosure are explained in detail with reference to the attached drawings. Note that in the present specification and the drawings, constituent elements having substantially identical functional configurations are given identical reference signs, and thereby overlapping explanations of those constituent elements are omitted.

Hereinafter, modes for carrying out the present technology are explained. The explanations are given in the following order.

1. Overview of Lensless Image-Capturing Apparatuses
2. Overview of Present Disclosure
3. First Embodiment
4. Second Embodiment
5. Third Embodiment 1. Overview of Lensless Image-Capturing Apparatuses Before the configuration of the present disclosure is explained, an overview of lensless image-capturing apparatuses is explained by making a comparison with the configuration of typical image-capturing apparatuses.

Figure 1:
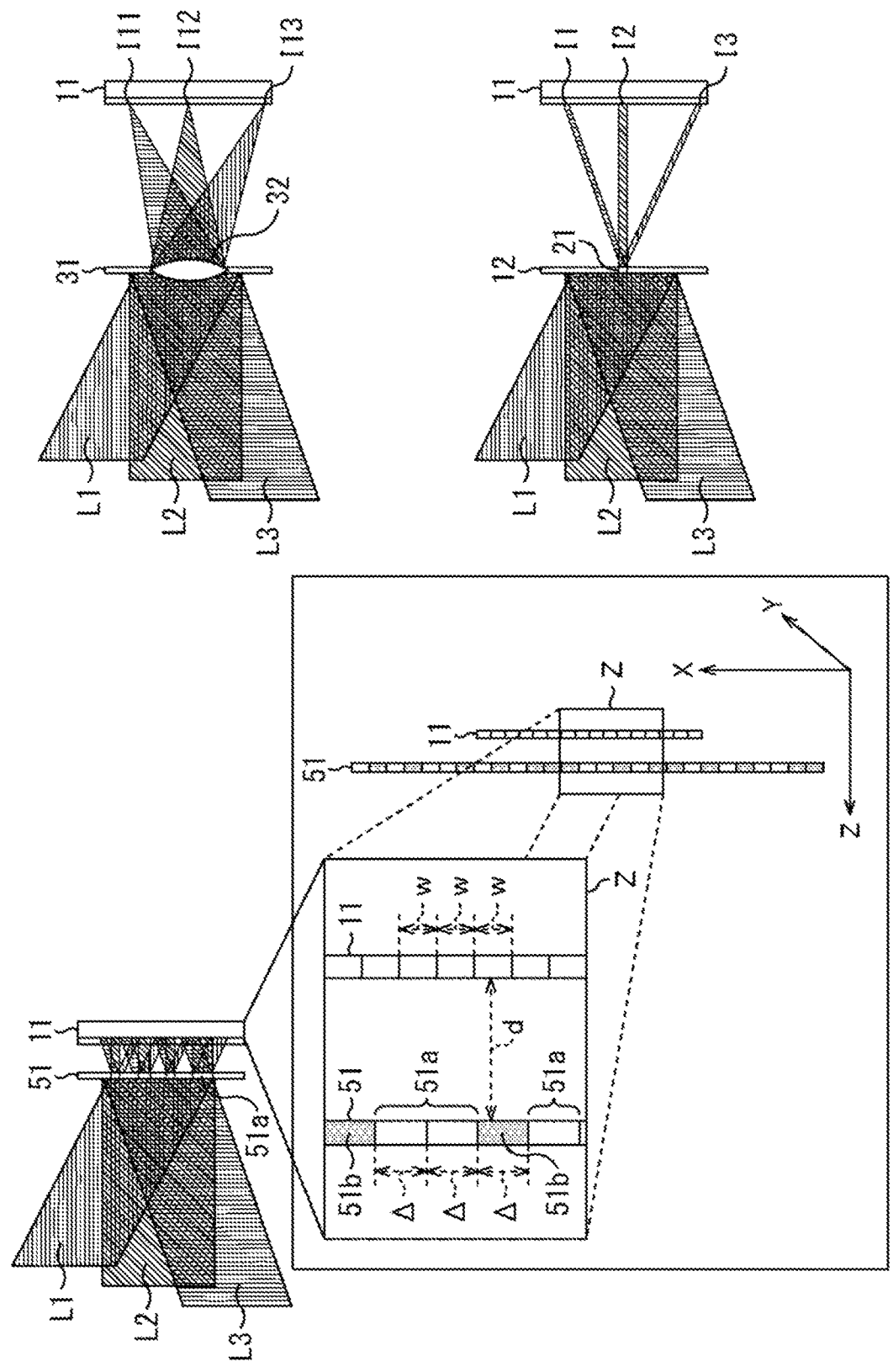
FIG. 1 is a diagram for explaining an overview of a lensless image-capturing apparatus.

Examples of the configuration of typical image-capturing apparatuses include a pinhole camera as illustrated at the lower right section in FIG. 1.

The image-capturing apparatus including the pinhole camera includes a solid-state image-capturing device 11 and a pinhole 21 provided as a hole section through a light-blocking film 12. In the case of the image-capturing apparatus including the pinhole, as illustrated at the lower right section in the FIG. 1, light rays L1 to L3 emitted from mutually different light sources on a subject plane are individually transmitted through the pinhole 21, and captured as images at pixels I1 to I3 on the solid-state image-capturing device 11.

In the case of the image-capturing apparatus including the pinhole camera, at the solid-state image-capturing device 11, an image is formed with only a light ray that is included in the light rays L1 to L3 emitted from the individual light sources, and corresponds to one pixel, and enters the corresponding pixel on the solid-state image-capturing device 11. Accordingly, the image is captured as a dark pictorial image.

In view of this, in one contrivance as illustrated at the upper right section in FIG. 1, an image-capturing lens 32 is provided at a middle of a light-blocking film 31, the image-capturing lens 32 concentrates the light rays L1 to L3 as illustrated by light rays I11 to I13, and forms individual images on the solid-state image-capturing device 11, and those images are captured by the solid-state image-capturing device 11.

In the case of the upper right section in FIG. 1, at the solid-state image-capturing device 11, images formed with light with a light intensity which equals the total of the light intensities of all the light rays L1 to L3 are formed, and caused to enter the solid-state image-capturing device 11. Thereby, the images are captured as pictorial images with a sufficient light amount at each pixel of the solid-state image-capturing device 11.

As illustrated at the upper right section in FIG. 1, by using the image-capturing lens 32, the set of the individual point light sources constitute at least part of a subject. Accordingly, in image-capturing of the subject, light rays emitted from a plurality of point light sources on the subject plane are concentrated, and an image of the subject formed thereby is captured.

As explained with reference to the upper right section in FIG. 1, a role of the image-capturing lens 32 is to guide each light ray exiting one of the point light sources, that is, spread light, onto the solid-state image-capturing device 11. Accordingly, this results in formation of an image corresponding to a final pictorial image on the solid-state image-capturing device 11, and a pictorial image formed with detection signals detected at the individual pixels on the solid-state image-capturing device 11 becomes a captured pictorial image in which the image is formed.

However, there has been a limitation in the size-reduction of image-capturing apparatuses (image-capturing devices) since the sizes of the image-capturing apparatuses are determined by their image-capturing lenses, and focal lengths of the image-capturing lenses.

In view of this, in one contrivance as illustrated at the upper left section in FIG. 1, an image of a subject on a subject plane is captured by using the solid-state image-capturing device 11 and a mask 51 without providing an image-capturing lens and a pinhole.

At the upper left section in FIG. 1, the mask 51 including opening sections 51a with a plurality of sizes is provided before the solid-state image-capturing device 11, and the light rays L1 to L3 from the individual light sources are modulated, enter the image-capturing plane of the solid-state image-capturing device 11, and are received by the individual pixels on the solid-state image-capturing device 11.

Here, at the mask 51, as illustrated at the lower left section in FIG. 1, the opening sections 51a and light-blocking sections 51b have sizes that are set randomly in the horizontal direction and in the vertical direction in the unit of the unit size Δ, thereby forming a mask pattern on the mask 51. The unit size Δ is a size at least larger than the size of the pixels. In addition, a gap with a minute distance d is provided between the solid-state image-capturing device 11 and the mask 51. In addition, at the lower left section in FIG. 1, pitches between the pixels on the solid-state image-capturing device 11 are set to w. With such a configuration, depending on the sizes of the unit size Δ and the distance d, the light rays L1 to L3 are modulated before entering the solid-state image-capturing device 11.

Figure 2:
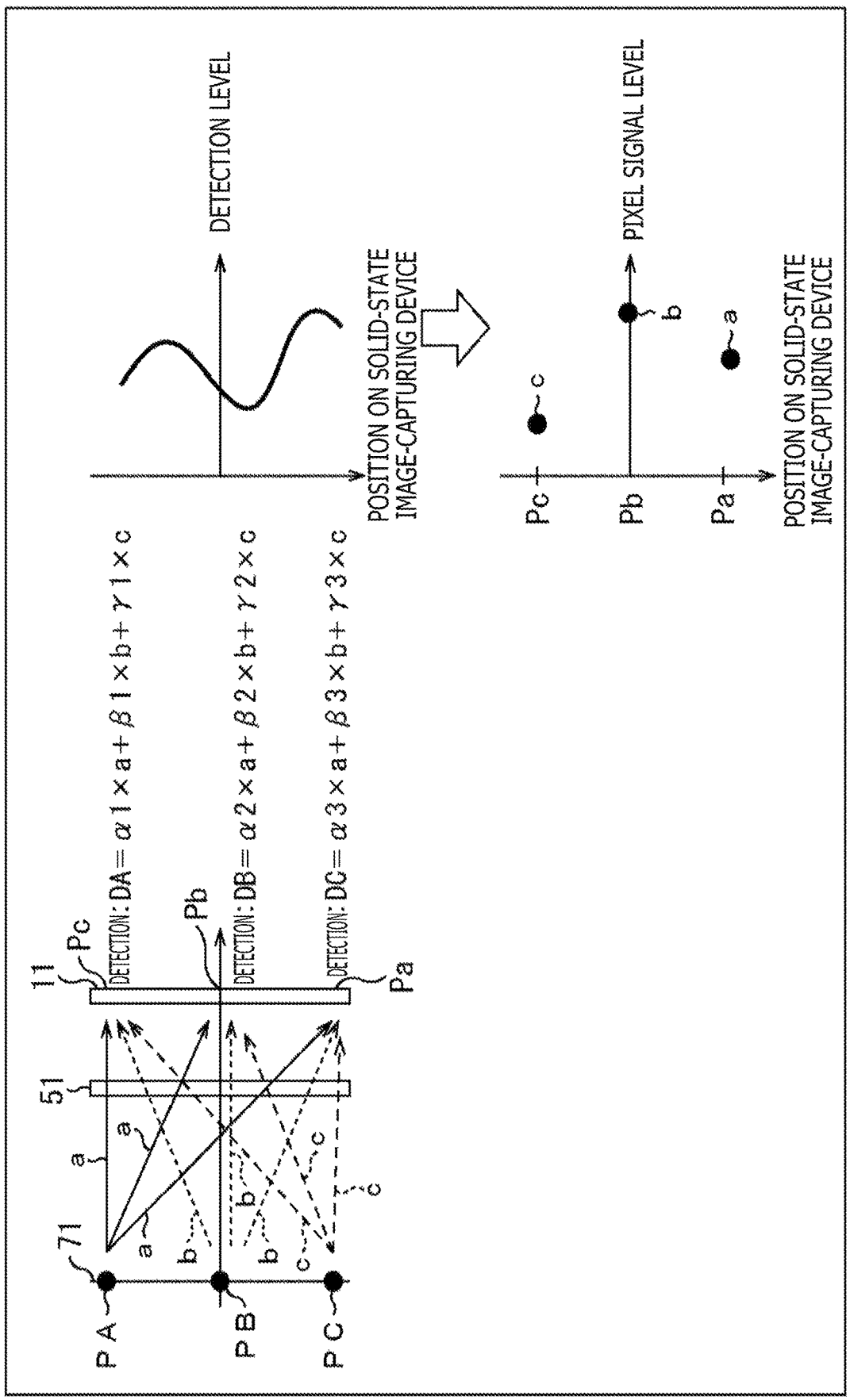
FIG. 2 is a diagram for explaining the image-capturing principle in the lensless image-capturing apparatus.

More specifically, for example, as illustrated at the upper left section in FIG. 2, the light sources of the light rays L1 to L3 at the upper left section in FIG. 1 may be point light sources PA, PB, and PC, and light rays with light intensities a, b, and c may enter each of positions Pa, Pb, and Pc on the solid-state image-capturing device 11 where the light rays enter after being transmitted through the mask 51.

In the case of the lensless image-capturing apparatus, as illustrated at the upper left section in FIG. 2, the detection sensitivity of each pixel is given a directionality according to the angle of incidence of incident light since the incident light is modulated by the opening sections 51a randomly set through the mask 51. That the detection sensitivity of each pixel is given an angle-of-incidence directionality mentioned here means that the photosensitivity characteristics according to the angles of incidence of incident light are made different depending on areas on the solid-state image-capturing device 11.

That is, in a case that it is supposed that the light sources constituting at least part of a subject plane 71 are point light sources, this results in entrance, to the solid-state image-capturing device 11, of light rays with identical light intensities emitted from the identical point light sources, but since the light rays are modulated by the mask 51, the angles of incidence of the light rays differ among individual areas on the image-capturing plane of the solid-state image-capturing device 11. Then, due to the differences in the angles of incidence of the incident light among the areas on the solid-state image-capturing device 11 that are generated by the mask 51, the photosensitivity characteristics differ among the areas, that is, the areas have angle-of-incidence directionalities.

Accordingly, this results in detection of light rays at sensitivity that differs among the individual areas on the solid-state image-capturing device 11 even if the light rays have identical light intensities, due to the mask 51 provided before the image-capturing plane of the solid-state image-capturing device 11, and detection signals at detection signal levels that differ among the individual areas are detected.

More specifically, as illustrated at the upper right section in FIG. 2, detection signal levels DA, DB, and DC of the pixels at the positions Pa, Pb, and Pc on the solid-state image-capturing device 11 are represented by the following Formula (1) to Formula (3), respectively.

$$DA = \alpha1 \times a + \beta1 \times b + \gamma1 \times c \quad (1)$$

$$DB = \alpha2 \times a + \beta2 \times b + \gamma2 \times c \quad (2)$$

$$DC = \alpha3 \times a + D3 \times b + \gamma3 \times c \quad (3)$$

Here, $\alpha1$ is a coefficient for the detection signal level a set according to the angle of incidence of a light ray from the point light source PA on the subject plane 71 to be restored at the position Pa on the solid-state image-capturing device 11.

In addition, $\beta1$ is a coefficient for the detection signal level b set according to the angle of incidence of a light ray from the point light source PB on the subject plane 71 to be restored at the position Pa on the solid-state image-capturing device 11.

Furthermore, $\gamma1$ is a coefficient for the detection signal level c set according to the angle of incidence of a light ray from the point light source PC on the subject plane 71 to be restored at the position Pa on the solid-state image-capturing device 11.

Accordingly, $(\alpha1 \times a)$ in the detection signal level DA indicates the detection signal level of the light ray from the point light source PA at the position Pc.

In addition, $(\beta1 \times b)$ in the detection signal level DA indicates the detection signal level of the light ray from the point light source PB at the position Pc.

Furthermore, $(\gamma1 \times c)$ in the detection signal level DA indicates the detection signal level of the light ray from the point light source PC at the position Pc.

Accordingly, the detection signal level DA is expressed as a composite value of the individual components of the point light sources PA, PB, and PC at the position Pa multiplied by the coefficients $\alpha1$, $\beta1$, and $\gamma1$, respectively. Hereinafter, the coefficients $\alpha1$, $\beta1$, and $\gamma1$ are collectively called a coefficient set.

Similarly, a coefficient set $\alpha2$, $\beta2$, and $\gamma2$ in the detection signal level DB at the point light source PB corresponds to the coefficient set $\alpha1$, $\beta1$, and $\gamma1$, respectively, in the detection signal level DA at the point light source PA. In addition, a coefficient set $\alpha3$, $\beta3$, and $\gamma3$ in the detection signal level DC at the point light source PC corresponds to the coefficient set $\alpha1$, $\beta1$, and $\gamma1$, respectively, in the detection signal level DA at the point light source PA.

It should be noted however that the detection signal levels of the pixels at the positions Pa, Pb, and Pc are values expressed by the sum of the products of the light intensities a, b, and c of the light rays emitted from the point light sources PA, PB, and PC, respectively, by the coefficients. Because of this, these detection signal levels are mixtures of the light intensities a, b, and c of the light rays emitted from the point light sources PA, PB, and PC, respectively, and accordingly are different from those with which an image of the subjects is formed.

That is, simultaneous equations using the coefficient set $\alpha1$, $\beta1$, and $\gamma1$, the coefficient set $\alpha2$, $\beta2$, and $\gamma2$, the coefficient set $\alpha3$, $\beta3$, and $\gamma3$, and the detection signal levels DA, DB, and DC are formed, and are solved for the light intensities a, b, and c, to thereby obtain pixel values at the individual positions Pa, Pb, and Pc as illustrated at the lower right section in FIG. 2. Thereby, a restored pictorial image (final pictorial image), which is a set of the pixel values, is reconstructed and restored.

In addition, although in the case illustrated at the upper left section in FIG. 2 that a distance between the solid-state image-capturing device 11 and the subject plane 71 varies, the coefficient set $\alpha1$, $\beta1$, and $\gamma1$, the coefficient set $\alpha2$, $\beta2$, and $\gamma2$, and the coefficient set $\alpha3$, $\beta3$, and $\gamma3$ vary individually, restored pictorial images (final pictorial images) of subject planes at various distances can be reconstructed by changing the coefficient sets.

Because of this, by changing the coefficient sets to those corresponding to various distances, pictorial images of subject planes at various distances from an image-capturing position can be reconstructed by performing image-capturing once.

As a result, in image-capturing performed by using a lensless image-capturing apparatus, it is not necessary to be aware of phenomena like what is generally called defocusing that occur when image-capturing is performed with an image-capturing apparatus using a lens in a state that an image is out of focus. As long as image-capturing is performed such that subjects that are desired to be captured are included in the angle of view, pictorial images of subject planes at various distances can be reconstructed after the image-capturing, by changing the coefficient sets to coefficients according to the distances.

Note that detection signal levels illustrated at the upper right section in FIG. 1 are not detection signal levels corresponding to a pictorial image in which an image of the subject is formed, and so are not pixel values. In addition, detection signal levels illustrated at the lower right section in FIG. 1 are each the signal value of each pixel corresponding to a pictorial image in which an image of a subject is formed, that is, the value of each pixel of a restored pictorial image (final pictorial image), and so are pixel values.

With such a configuration, it becomes possible to realize what is generally called a lensless image-capturing apparatus that does not require an image-capturing lens and a pinhole. As a result, an image-capturing lens, a pinhole and the like are not essential configurations, and accordingly the height of the image-capturing apparatus can be made short, that is, the thickness of the image-capturing apparatus in the direction of incidence of light in a configuration to realize an image-capturing function can be made thin. In addition, by changing the coefficient sets in various manners, it becomes possible to reconstruct and restore final pictorial images (restored pictorial images) on subject planes at various distances.

Note that hereinafter a pictorial image that has been captured by a solid-state image-capturing device, and has not been reconstructed is referred to simply as a captured pictorial image, and a pictorial image that has been reconstructed and restored by performing signal processing on the captured pictorial image is referred to as a final pictorial image (restored pictorial image). Accordingly, from a single captured pictorial image, pictorial images on subject planes 71 at various distances can be reconstructed as final pictorial images by changing the coefficient sets mentioned above in various manners.

However, if the light rays L1 to L3 enter the opening sections 51a provided through the mask 51 in the lensless image-capturing apparatus, diffraction occurs when the light rays L1 to L3 exit. Thereby, the incident light spreads, and appears as blurs on a pictorial image captured on the solid-state image-capturing device 11. As a result, if a final pictorial image is obtained through reconstruction with no changes being made thereto, the final pictorial image to be obtained is inevitably a pictorial image with a low spatial resolution due to the influence of blurs.

Meanwhile, the significance of the influence of diffraction can be changed by the wavelength of incident light, and the unit size which is the minimum unit for adjusting the sizes of the opening sections 51a.

In view of this, in a lensless image-capturing apparatus of the present disclosure, the mask 51 and the solid-state image-capturing device 11 are divided into a plurality of areas, and a band-pass filter that varies the wavelength band of incident light is provided for each divided area before the mask 51. Then, the sizes of the opening sections 51a are provided on the mask 51 with the unit sizes according to the wavelength bands of light to be transmitted by the band-pass filters of the individual areas such that the influence of spreading of the incident light resulting from diffraction is reduced.

With such a configuration, a captured pictorial image is captured in each area while the influence of diffraction is reduced appropriately according to the wavelength band of incident light set for each area, a final pictorial image of each area is reconstructed by performing signal processing, and the final pictorial images are synthesized. As a result, it becomes possible in the lensless image-capturing apparatus to reduce the influence of blurring due to diffraction, and to reconstruct final pictorial images with high spatial resolutions in image-capturing by using incident light in a wide range of incident-light wavelength bands.

2. Overview of Present Disclosure

Figure 3:
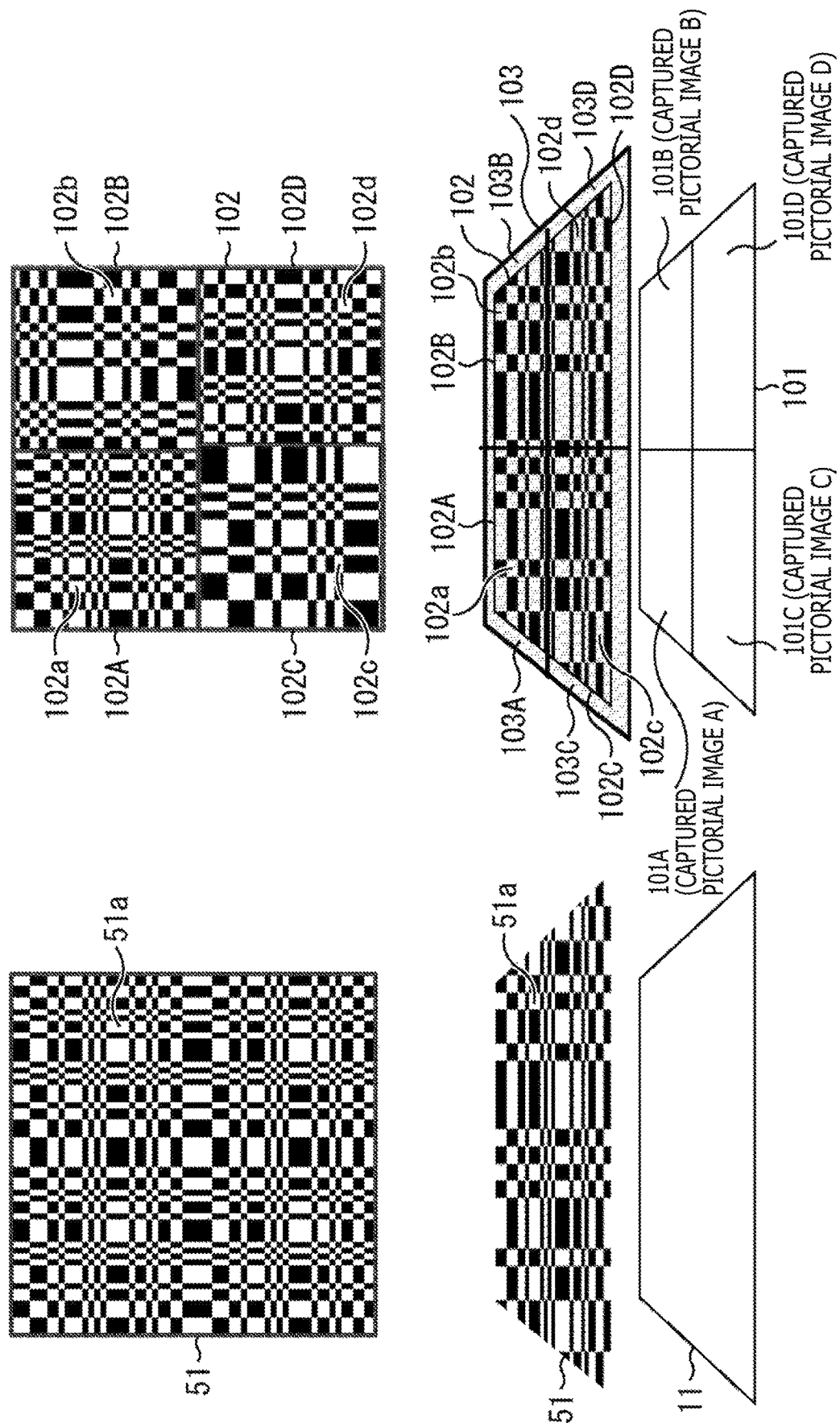
FIG. 3 is a diagram for explaining an overview of a first embodiment of the present disclosure.

Next, an overview of an image-capturing device of the lensless image-capturing apparatus of the present disclosure is explained with reference to FIG. 3. Note that the left section in FIG. 3 illustrates a configuration example of an image-capturing device in a typical lensless image-capturing apparatus, the upper left section is a top view of the mask 51, and the lower left section is a perspective view of the mask 51 and the solid-state image-capturing device 11 as seen laterally and obliquely from above. In addition, the right section in FIG. 3 illustrates a configuration example of the image-capturing device in the lensless image-capturing apparatus of the present disclosure, the upper right section is a top view of a mask 102, and the lower right section is a perspective view of the mask 102 and a solid-state image-capturing device 101 in a state that a band-pass filter 103 is provided before the mask 102 as seen laterally and obliquely from above.

As illustrated at the left section in FIG. 3, for example, in the image-capturing device of the typical lensless image-capturing apparatus, the unit size of the opening sections 51a of the mask 51 is set uniformly for all the areas, and at the solid-state image-capturing device 11, a single pictorial image is captured as a whole by using light that has been transmitted through the mask 51.

In contrast to this, in the image-capturing device in the lensless image-capturing apparatus of the present disclosure, each of the solid-state image-capturing device 101, the mask 102, and the band-pass filter 103 is divided into four areas in total by dividing each of them into two areas in both the horizontal direction and the vertical direction, and four captured pictorial images for identical subjects are captured by using incident light in mutually different wavelength bands that enter the individual areas.

More specifically, the mask 102 is divided into four areas in total including areas 102A to 102D, and in the areas 102A to 102D, opening sections 102a to 102d with different unit sizes are provided, respectively.

In addition, the unit sizes of the opening sections 102a to 102d are set randomly according to the wavelength bands of light that are transmitted through individual areas 103A to 103D of the band-pass filter 103 provided before the mask 102.

That is, the unit size of the opening sections 102a of the area 102A is set to such a unit size that the influence of diffraction is minimized when light in a wavelength band to be transmitted through the area 103A of the band-pass filter 103 is transmitted.

In addition, the unit size of the opening sections 102b of the area 102B is set to such a unit size that the influence of diffraction is minimized when light in a wavelength band to be transmitted through the area 103B of the band-pass filter 103 is transmitted.

Furthermore, the unit size of the opening sections 102c of the area 102C is set to such a unit size that the influence of diffraction is minimized when light in a wavelength band to be transmitted through the area 103C of the band-pass filter 103 is transmitted.

In addition, the unit size of the opening sections 102d of the area 102D is set to such a unit size that the influence of diffraction is minimized when light in a wavelength band to be transmitted through the area 103D of the band-pass filter 103 is transmitted.

The solid-state image-capturing device 101 is also divided into four areas, areas 101A to 101D, such that those areas correspond to the areas 102A to 102D, and the area 101A of the solid-state image-capturing device 101 captures a captured pictorial image A formed with light in the wavelength band transmitted through the area 103A of the band-pass filter 103.

In addition, the area 101B of the solid-state image-capturing device 101 captures a captured pictorial image B formed with light in the wavelength band transmitted through the area 103B of the band-pass filter 103.

Furthermore, the area 101C of the solid-state image-capturing device 101 captures a captured pictorial image C formed with light in the wavelength band transmitted through the area 103C of the band-pass filter 103.

In addition, the area 101D of the solid-state image-capturing device 101 captures a captured pictorial image D formed with light with a wavelength transmitted through the area 103D of the band-pass filter 103.

Then, it becomes possible to capture the captured pictorial images A to D which are less influenced by blurring due to diffraction in the individual wavelength bands. In addition, by performing signal processing in the lensless image-capturing apparatus mentioned above on the basis of the captured pictorial images A to D, final pictorial images A to D are generated, and the final pictorial images A to D are combined to be synthesized into a single final pictorial image. Thereby a single final pictorial image with a high spatial resolution can be restored.

3. First Embodiment

Next, a configuration example of the lensless image-capturing apparatus (lensless image-capturing apparatus) of the present disclosure is explained with reference to FIG. 4.

Figure 4:
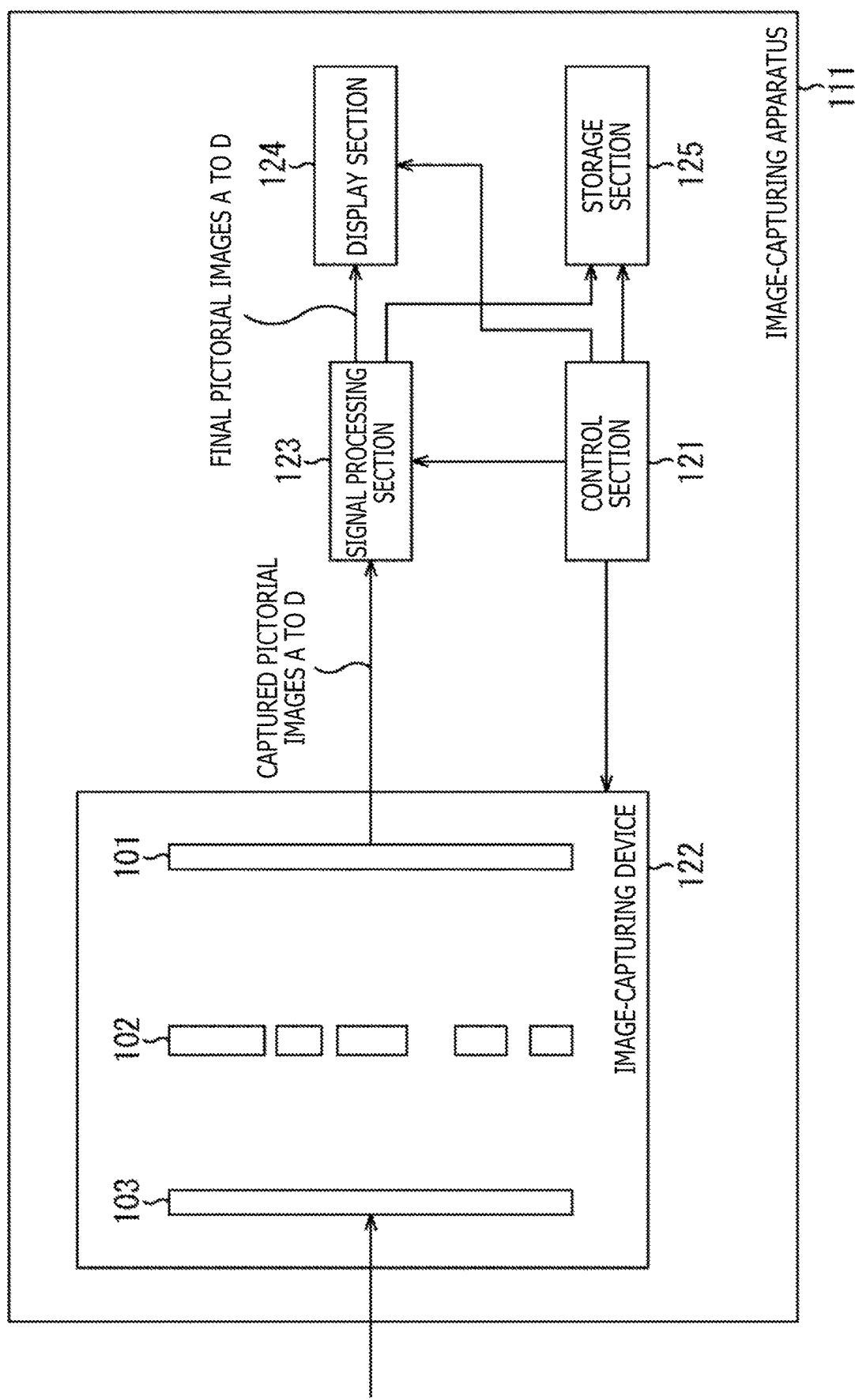
FIG. 4 is a block diagram for explaining a configuration example of a lensless image-capturing apparatus of the present disclosure.

FIG. 4 illustrates a configuration example of the lateral cross-sectional of a lensless image-capturing apparatus 111 of the present disclosure. More specifically, the lensless image-capturing apparatus 111 in FIG. 4 includes a control section 121, an image-capturing device 122, a signal processing section 123, a display section 124, and a storage section 125.

The control section 121 includes a processor and the like, and controls overall operations of the lensless image-capturing apparatus 111.

The image-capturing device 122 has the configuration explained with reference to the right section in FIG. 3, captures, as captured pictorial images, pictorial images formed with pixel signals according to the light amount of incident light from a subject indicated by the right arrow in FIG. 4, and outputs the captured pictorial images to the signal processing section 123.

More specifically, the image-capturing device 122 corresponds to the right section in FIG. 3, and includes the band-pass filter 103, the mask 102, and the solid-state image-capturing device 101 from the left side in the figure.

As explained with reference to FIG. 3, the band-pass filter 103 is divided into two areas in both the horizontal direction and the vertical direction, that is, divided into four areas in total, the areas 103A to 103D, and the different areas transmit light in different wavelength bands of incident light.

Figure 5:
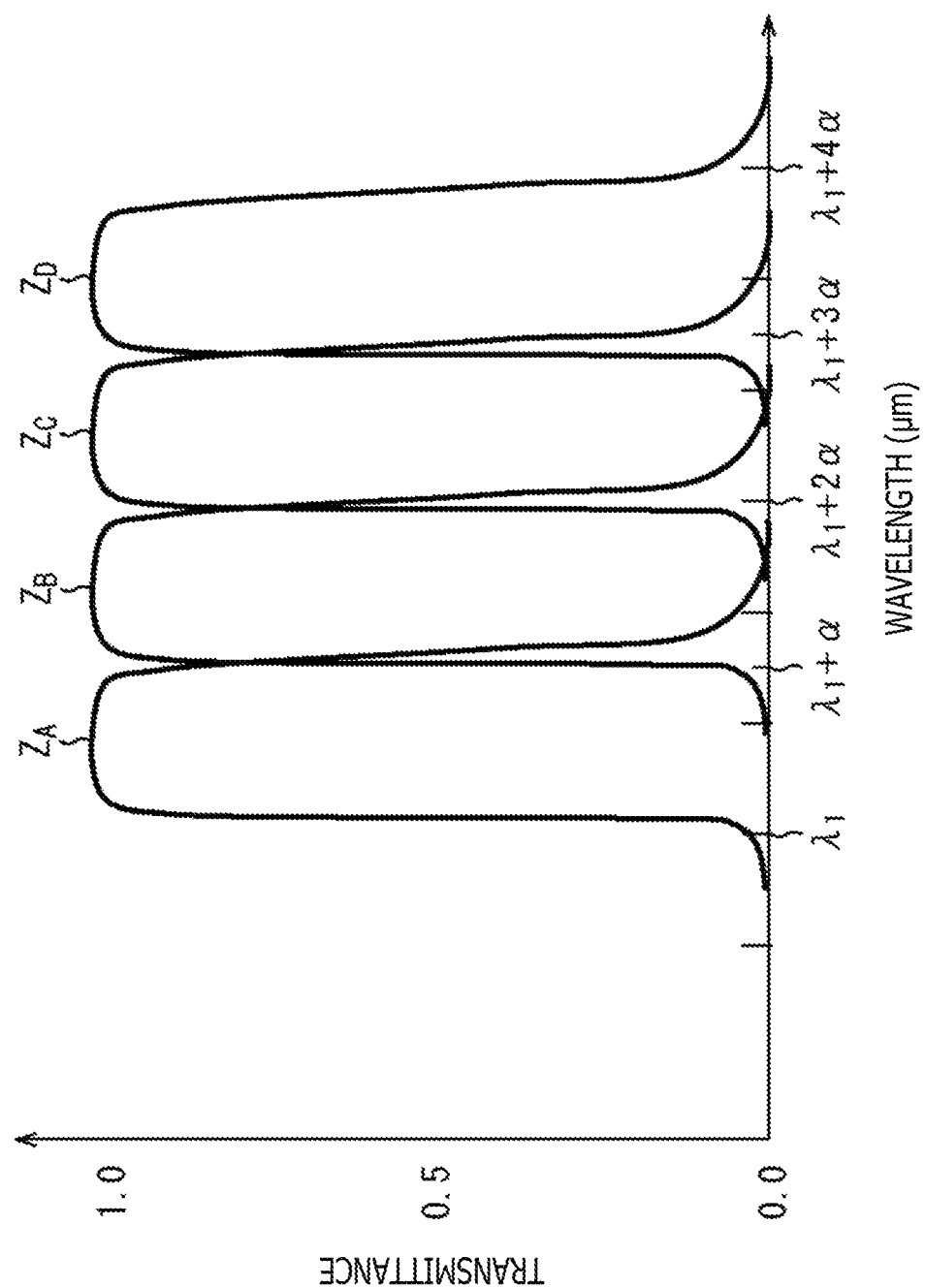
FIG. 5 is a diagram for explaining operations of a band-pass filter.

For example, as illustrated in FIG. 5, the area 103A of the band-pass filter 103 transmits incident light in a wavelength band ZA near predetermined wavelengths Xl to $\lambda 1+\alpha$ of the incident light, the area 103B transmits incident light in a wavelength band ZB near predetermined wavelengths $\lambda 1+\alpha$ to $\lambda 1+2\alpha$ of the incident light, the area 103C transmits incident light in a wavelength band ZC near predetermined wavelengths $\lambda 1+2\alpha$ to $\lambda 1+3\alpha$ of the incident light, and the area 103D transmits incident light in a wavelength band ZD near predetermined wavelengths $\lambda 1+3\alpha$ to $\lambda 1+4\alpha$ of the incident light.

Here, $\lambda 1$ is a predetermined wavelength of the incident light, and $\alpha$ is a predetermined constant.

Accordingly, the areas 103A to 103D of the band-pass filter 103 transmit the incident light in the mutually different wavelength bands ZA to ZD of the incident light. Note that although the wavelength bands ZA to ZD are wavelength bands having nearly identical widths in FIG. 5, they need not have identical widths, and may have different widths.

As illustrated at the right section in FIG. 3, the mask 102 is divided into the areas 102A to 102D such that those areas correspond to the areas 103A to 103D of the band-pass filter 103. The unit size Δ (see the lower left section in FIG. 1) for adjusting the intervals between light-blocking sections and opening sections in each mask is adjusted such that the influence of diffraction is minimized corresponding to the wavelength of light to be transmitted.

For example, in a case that the interval between the mask 102 and the solid-state image-capturing device 101 is the predetermined distance d, the magnitude of diffraction that occurs in a case that incident light is transmitted through the mask 102 varies depending on the wavelength of the transmitted light, and the unit size Δ for adjusting the sizes of the opening sections.

Figure 6:
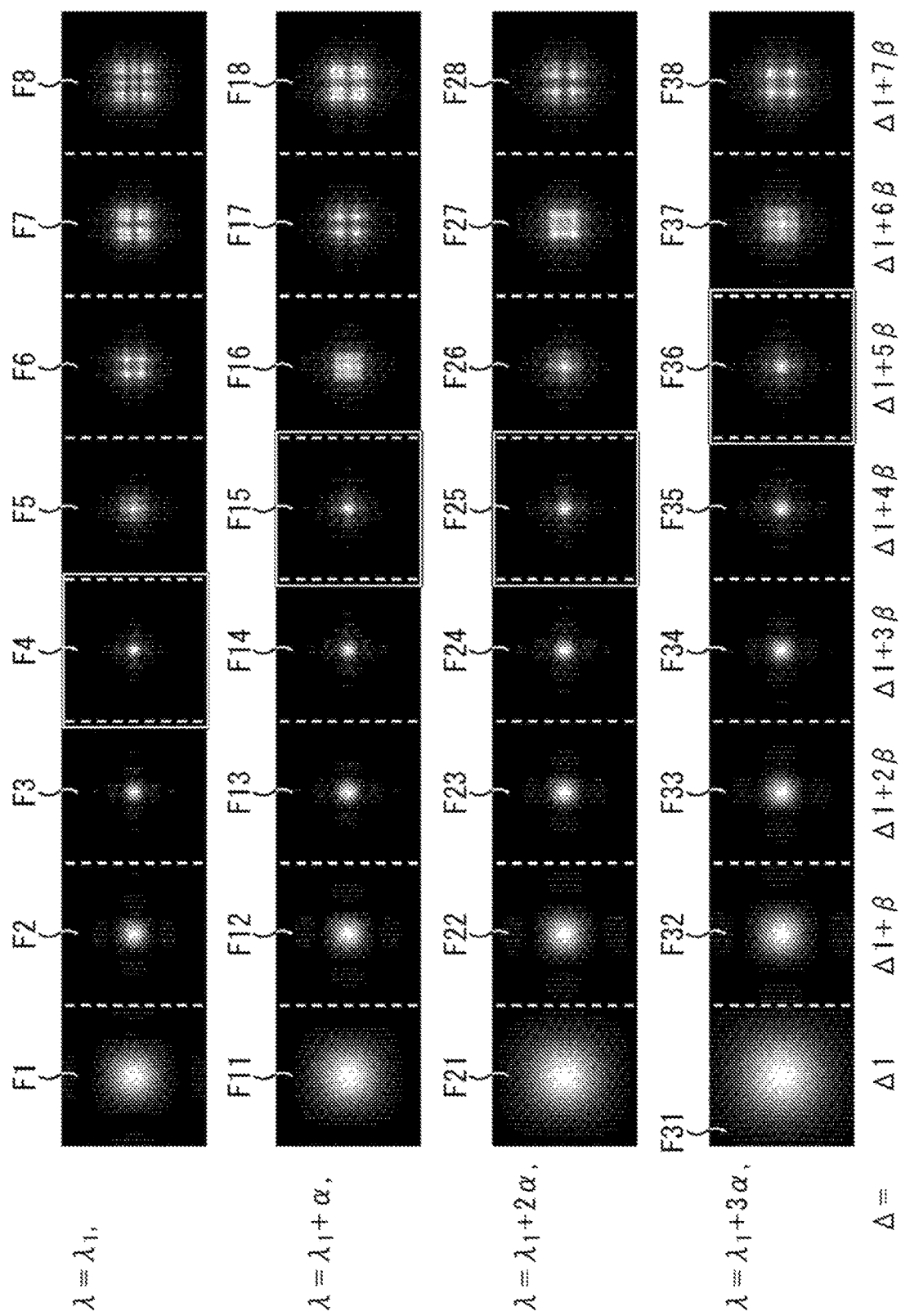
FIG. 6 is a diagram for explaining variations among pictorial images that are observed when modulated light is captured in cases that a unit size of a mask and a wavelength of incident light are varied.

For example, as illustrated in the topmost line in FIG. 6, when the wavelength of incident light is the wavelength $\lambda 1$, and the size of one opening section, the unit size Δ, is varied in increments of a predetermined width β from Δ1 to Δ1+7β from the left side in the figure, captured pictorial images of incident light passing through one opening section captured by the solid-state image-capturing device 101 vary as illustrated by captured pictorial images F1 to F8.

If diffraction occurs due to the opening section, incident-light pictorial images that are formed with the incident light do not become spot-like pictorial images on the image-capturing plane of the solid-state image-capturing device 101, and become pictorial images that present scattered and spreading light, and furthermore the magnitude of the spreading varies depending on the degree of the influence of diffraction.

That is, in the case of the topmost line in FIG. 6 that the wavelength of the incident light is the wavelength $\lambda 1$, the captured pictorial image F4 (unit size Δ=Δ1+3β) presents the brightest spot with the smallest diameter, and it can be considered that the influence of diffraction is minimized. In addition, at this time, as the unit size Δ decreases as illustrated by the captured pictorial images F3, F2, and F1 or as the unit size Δ increases as illustrated by the captured pictorial images F5 to F8, the spots near the centers spread, and the influence of diffraction gradually increases.

In addition, as illustrated in the second topmost line in FIG. 6, when the wavelength of incident light is the wavelength $\lambda 1+\alpha$, and the unit size Δ is varied in increments of the predetermined width β from Δ1 to Δ1+7β, captured pictorial images of incident light passing through one opening section captured by the solid-state image-capturing device 101 vary as illustrated by captured pictorial images F1 to F18.

That is, in the case of the second line in FIG. 6 that the wavelength of the incident light is the wavelength $\lambda 1+\alpha$, the captured pictorial image F15 (unit size Δ=Δ1+4β) presents the brightest spot with the smallest diameter, and it can be considered that the influence of diffraction is minimized. In addition, as the unit size Δ decreases as illustrated by the captured pictorial images F14, F13, F12, and F11 or as the unit size Δ increases as illustrated by the captured pictorial images F16 to F18, the spots near the centers spread, and the influence of diffraction gradually increases.

Furthermore, as illustrated in the third topmost line in FIG. 6, when the wavelength of incident light is the wavelength λ1+2α, and the unit size Δ is varied in increments of the predetermined width β from Δ1 to Δ1+7β, captured pictorial images of incident light passing through one opening section captured by the solid-state image-capturing device 101 vary as illustrated by captured pictorial images F21 to F28.

That is, in the case of the third line in FIG. 6 that the wavelength of the incident light is the wavelength λ1+2α, the captured pictorial image F25 (unit size Δ=Δ1+4β) presents the brightest spot with the smallest diameter, and it can be considered that the influence of diffraction is minimized. In addition, as the unit size Δ decreases as illustrated by the captured pictorial images F24, F23, F22, and F21 or as the unit size Δ increases as illustrated by the captured pictorial images F26 to F28, the spots near the centers spread, and the influence of diffraction gradually increases.

In addition, as illustrated in the fourth topmost line in FIG. 6, when the wavelength of incident light is the wavelength λ1+3α, and the unit size Δ is varied in increments of the predetermined width β from Δ1 to Δ1+7β, captured pictorial images of incident light passing through one opening section captured by the solid-state image-capturing device 101 vary as illustrated by captured pictorial images F31 to F38.

That is, in the case of the fourth line in FIG. 6 that the wavelength of the incident light is the wavelength λ1+3α, the captured pictorial image F36 (unit size Δ=Δ1+5β) presents the brightest spot with the smallest diameter, and it can be considered that the influence of diffraction is minimized. In addition, as the unit size Δ decreases as illustrated by the captured pictorial images F35, F34, F33, F32, and F31 or as the unit size Δ increases as illustrated by the captured pictorial images F26 to F28, the spots near the centers spread, and the influence of diffraction gradually increases.

In view of this, in a case that each of the areas 103A to 103D of the band-pass filter 103 transmits light in a corresponding wavelength band of the wavelength bands ZA to ZD illustrated in FIG. 5, incident light can be modulated, and caused to enter the solid-state image-capturing device 101 in a state that the influence of diffraction occurring to light in the wavelength band is minimized, by setting the unit sizes Δ of the opening sections 102a to 102d in the areas 102A to 102D of the corresponding mask 102 to Δ1+3β, Δ1+4β, Δ1+4β, and Δ1+5β, respectively.

As a result, it becomes possible for the areas 101A to 101D of the solid-state image-capturing device 101 to capture four captured pictorial images of the individual wavelength bands each with minimized influence of blurring due to diffraction.

The solid-state image-capturing device 101 is at least partially constituted by a CMOS image sensor or the like, captures a captured pictorial image formed with a pixel signal according to the light amount of incident light in each pixel unit, and outputs the captured image to the signal processing section 123. In addition, the solid-state image-capturing device 101 is divided into the areas 101A to 101D such that those areas correspond to the areas 103A to 103D of the band-pass filter 103, respectively, and the areas 102A to 102D of the mask 102, respectively, captures the four captured pictorial images A to D in total of identical spatial ranges formed with incident light in different wavelength bands for the different areas, and outputs the captured images A to D to the signal processing section 123. Note that although a single captured pictorial image formed with the four identical captured pictorial images A to D with parallaxes generated therebetween is captured in the spatial range of the areas 101A to 101D of the solid-state image-capturing device 101, the influence of the parallaxes between the captured pictorial images A to D is ignored in the explanation given here.

The signal processing section 123 solves simultaneous equations as explained, for example, by using FIG. 2 and Formula (1) to Formula (3) for pictorial-image signals of the captured pictorial images A to D supplied from the image-capturing device 122, to thereby reconstruct and synthesize the final pictorial images A to D for the areas 101A to 101D, and outputs the final pictorial images A to D as a single final pictorial image to the display section 124 and causes the single final pictorial image to be displayed on the display section 124, or causes the one final pictorial image to be stored in the storage section 125.

Figure 7:
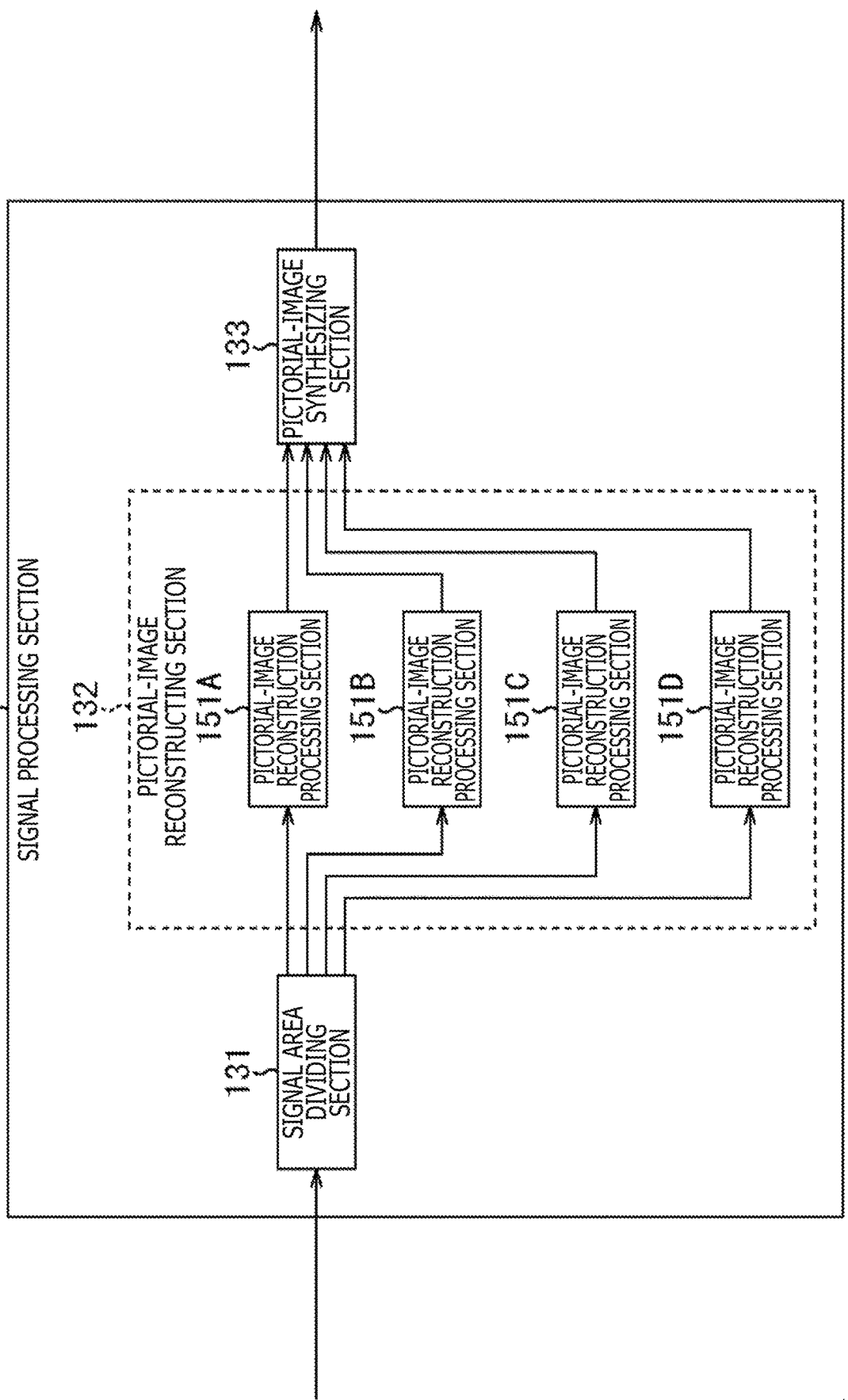
FIG. 7 is a diagram for explaining a configuration example of a signal processing section in FIG. 4.

Note that the detailed configuration of the signal processing section 123 is mentioned below in detail with reference to FIG. 7.

<Configuration Example of Signal Processing Section>

Next, a detailed configuration example of the signal processing section 123 is explained with reference to FIG. 7.

The signal processing section 123 includes a signal area dividing section 131, a pictorial-image reconstructing section 132, and a pictorial-image synthesizing section 133.

The signal area dividing section 131 divides a pictorial image supplied from the image-capturing device 122 into the captured pictorial images A to D each formed with a pixel signal of a corresponding area of the areas 101A to 101D, and outputs the captured pictorial images A to D to pictorial-image reconstruction processing sections 151A to 151D of the pictorial-image reconstructing section 132, respectively.

The pictorial-image reconstructing section 132 solves simultaneous equations as explained with reference to FIG. 2 and Formula (1) to Formula (3) for each of the four captured pictorial images A to D divided into the areas 101A to 101D, respectively, by the signal area dividing section 131, to thereby reconstruct the captured pictorial images A to D as the final pictorial images A to D, and outputs the reconstructed final pictorial images A to D to the pictorial-image synthesizing section 133.

More specifically, the pictorial-image reconstructing section 132 includes the pictorial-image reconstruction processing sections 151A to 151D that reconstruct the final pictorial images A to D from the captured pictorial images A to D of the areas 101A to 101D, respectively, divided by the signal area dividing section 131. The pictorial-image reconstruction processing sections 151A to 151D respectively reconstruct the final pictorial images A to D from the captured pictorial images A to D of the areas 101A to 101D, respectively, divided by the signal area dividing section 131, and outputs the final pictorial images A to D to the pictorial-image synthesizing section 133.

The pictorial-image synthesizing section 133 synthesizes the final pictorial images A to D reconstructed from the captured pictorial images A to D of the areas 101A to 101D of the solid-state image-capturing device 101 supplied from the pictorial-image reconstruction processing sections 151A to 151D of the pictorial-image reconstructing section 132, in such a manner that the final pictorial images A to D are superimposed, to form a single pictorial image. The pictorial-image synthesizing section 133 outputs the single pictorial image to the display section 124, and causes the one pictorial image to be displayed on the display section 124. The pictorial-image synthesizing section 133 outputs the one pictorial image to the storage section 125, and causes the one pictorial image to be stored in the storage section 125.

<Image-Capturing Process>

Figure 8:
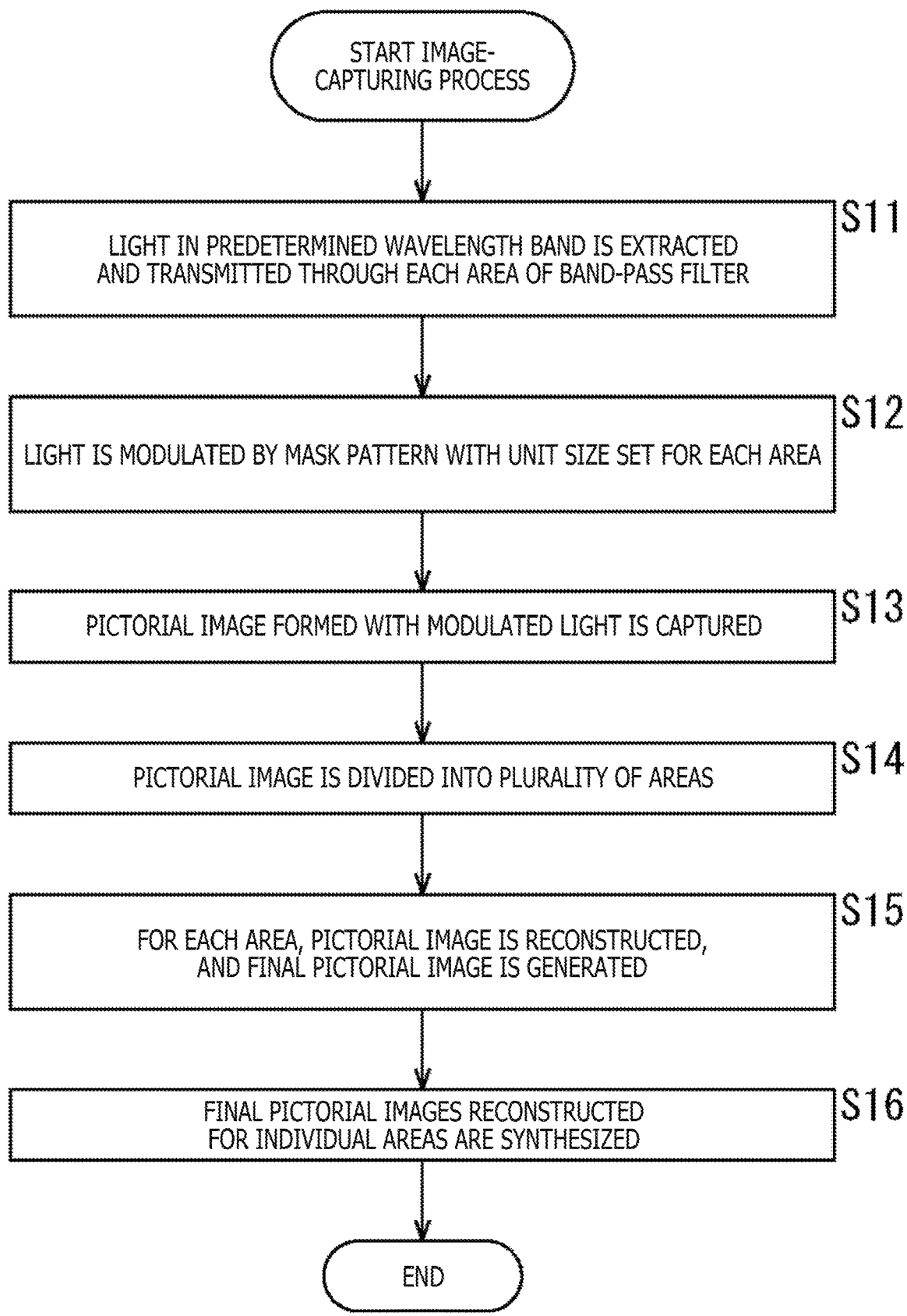
FIG. 8 is a flowchart for explaining an image-capturing process.

Next, an image-capturing process by the lensless image-capturing apparatus 111 in FIG. 1 is explained with reference to the flowchart in FIG. 8.

In Step S11, each of the areas 103A to 103D of the band-pass filter 103 transmits light in the corresponding one of the wavelength bands ZA to ZD of incident light that are explained with reference to FIG. 2.

In Step S12, each of the areas 102A to 102D of the mask 102 modulates the incident light by the corresponding one of the opening sections 102a to 102d according to the unit size Δ, and causes the incident light to enter the image-capturing lane of the solid-state image-capturing device 101.

In Step S13, each of the areas 101A to 101D of the solid-state image-capturing device 101 captures a corresponding one of the captured pictorial images A to D formed with the light modulated by being transmitted through the areas 102A to 102D of the mask 102, and the captured pictorial images A to D are output to the signal processing section 123 as a single captured pictorial image.

In Step S14, the signal area dividing section 131 of the signal processing section 123 divides the captured pictorial image supplied from the solid-state image-capturing device 101 of the image-capturing device 122 into the captured pictorial images A to D of the areas 101A to 101D, respectively, and outputs the captured pictorial images A to D to the pictorial-image reconstruction processing sections 151A to 151D of the pictorial-image reconstructing section 132, respectively.

In Step S15, the pictorial-image reconstruction processing sections 151A to 151D reconstruct the captured pictorial images A to D captured by the areas 101A to 101D of the solid-state image-capturing device 101, respectively, by the process explained with reference to FIG. 2 and Formula (1) to Formula (3), generates the final pictorial images A to D and outputs the final pictorial images A to D to the pictorial-image synthesizing section 133.

In Step S16, the pictorial-image synthesizing section 133 synthesizes the final pictorial images A to D obtained from the four captured pictorial images A to D, respectively, captured by the areas 101A to 101D in such a manner that the final pictorial images A to D are superimposed, and outputs the final pictorial images A to D as a single final pictorial image.

With the processes explained above, light is modulated by the opening sections and the light-blocking sections that have sizes according to the unit sizes Δ of the individual areas 102A to 102D of the mask 102 according to the wavelength bands of incident light. Thereby, it becomes possible to capture the captured pictorial images A to D of the individual wavelength bands in a state that the influence of diffraction is minimized, and it becomes possible to reconstruct the final pictorial images A to D from the captured pictorial images A to D that have been captured. As a result, it becomes possible to reduce the influence of blurring due to diffraction in the reconstructed final pictorial images A to D also, and it becomes possible to generate final pictorial images with high spatial resolutions.

In particular, since the influence of diffraction on light in long wavelength bands is significant, it becomes possible to effectively suppress occurrence of blurring due to the influence of diffraction on light in the long wavelength bands.

For example, in far infrared image sensing (thermographic sensing) known to be capable of capturing temperature information as an image, the temperature of a target is determined from the peak wavelength of integrated light in a wide range of long wavelength bands. More specifically, the range of wavelength bands to be sensed is typically considered to be around 8 to 14 μm. In this case, the longest wavelength of the sensing target is approximately twice as long as the shortest wavelength of the sensing target.

In addition, in recent years, there are many image-capturing systems that capture images from visible light and near infrared light simultaneously, but in this case also, blue has its peak 450 nm which becomes the shortest wavelength, near infrared light has its peak at 800 nm which becomes the longest wavelength, and thus the latter is approximately twice as long as the former.

In this manner, in a case that light in a wide range of wavelength bands is integrated and used for exposure, it becomes difficult to attempt optimization for reducing the influence of blurring due to diffraction for the entire region of the wide range of wavelength bands. For example, in a case that modulation to reduce the point spread on the side of the shorter wavelengths is designed, the point spread on the side of the longer wavelengths increases, and the spatial resolutions of pictorial images lower. The same thing applies similarly to the opposite case, and it becomes difficult to restore pictorial images with high spatial resolutions.

In view of this, for example, in a case that image sensing capable of capturing temperature information as an image is to be performed, the wavelength λ1 mentioned above in FIG. 5 is set to 8 μm, a is set to 1.5 μm, and the wavelength bands ZA to ZD are set to wavelength bands near 8 to 9.5 μm, 9.5 to 11 μm, 11 to 12.5 μm, and 12.5 to 14 μm. Thereby, the range of near infrared light to far infrared light can be set as appropriate wavelength bands. In addition, the unit size Δ of each of the areas 102A to 102D of the mask 102 is set such that the influence of diffraction is reduced in each wavelength band. Thereby, it becomes possible to realize image-capturing of temperature information less influenced by blurring due to diffraction.

In addition, the wavelength bands ZA to ZD mentioned above may be set to other wavelength bands, and, for example, may be set to RGB (red, green, and blue visible light) and IR (infrared light).

Furthermore, in the example in the explanation given above, each of the band-pass filter 103, the mask 102, and the solid-state image-capturing device 101 is divided into four areas according to wavelength bands, the captured pictorial images A to D are captured in the individual areas, and the final pictorial images A to D are reconstructed by performing signal processing by using the captured pictorial images A to D to synthesize the final pictorial images A and D into a single final pictorial image. However, the number of the divided areas may be any number other than four, and the band-pass filter 103, the mask 102, and the solid-state image-capturing device 101 may be divided into a larger number of areas only to the extent that such division does not cause significant deterioration of resolution. In addition, since the final pictorial images A to D are synthesized eventually, the sizes of the individual areas are desirably approximately identical to each other; however, they do not have to strictly be identical, and they are only required to have such sizes that a spatial range that is required in the final pictorial images is covered by the captured pictorial images as a whole.

Furthermore, when synthesizing a plurality of pictorial images, the pictorial-image synthesizing section 133 may synthesize the plurality of pictorial images after performing parallax correction according to the positions of the pictorial images captured in the plurality of areas in the one solid-state image-capturing device 101. Thereby, the spatial resolution can be improved.

In addition, although in the example explained above, the pictorial-image synthesizing section 133 synthesizes a plurality of reconstructed final pictorial images into a single pictorial image in such a manner that the plurality of reconstructed final pictorial images is superimposed, the plurality of reconstructed final pictorial images may be regarded as being synthesized as long as a single pictorial image can eventually be generated by using the plurality of final pictorial images.

Accordingly, the pictorial-image synthesizing section 133 may synthesize the plurality of final pictorial images by selecting a single final pictorial image from the plurality of final pictorial images, for example. The single final pictorial image to be selected here may be a pictorial image which is least influenced by diffraction, for example.

In addition, the pictorial-image synthesizing section 133 may select a plurality of final pictorial images from the plurality of final pictorial images, and synthesize the plurality of final pictorial images in such a manner that the selected final pictorial images are superimposed, for example. The plurality of final pictorial images to be selected here may be a plurality of final pictorial images which is relatively less influenced by diffraction, for example.

4. Second Embodiment

In the example explained above, each of the band-pass filter 103, the mask 102, and the solid-state image-capturing device 101 is divided into a plurality of corresponding areas, the wavelength band of incident light to be transmitted by the band-pass filter 103 is set for each divided area, and incident light is modulated by the mask 102 including opening sections each having the unit size according to the wavelength band for a corresponding area. Thereby, a captured pictorial image is captured in each area in a state that the influence of diffraction is reduced, a final pictorial image is reconstructed from the captured pictorial image captured in each area, and the final pictorial images of the individual areas are synthesized. Thereby, a single final pictorial image with a high spatial resolution is captured by reducing the influence of blurring due to diffraction.

However, the degree of the influence of diffraction can also be adjusted by the distance between the mask 102 and the solid-state image-capturing device 101 according to the wavelength band of incident light. In view of this, the opening sections of the mask 102 may be formed to have identical unit sizes Δ in all the areas, and the distance between the mask 102 and the solid-state image-capturing device 101 may be varied for each area according to the wavelength band of incident light to reduce the influence of diffraction.

Figure 9:
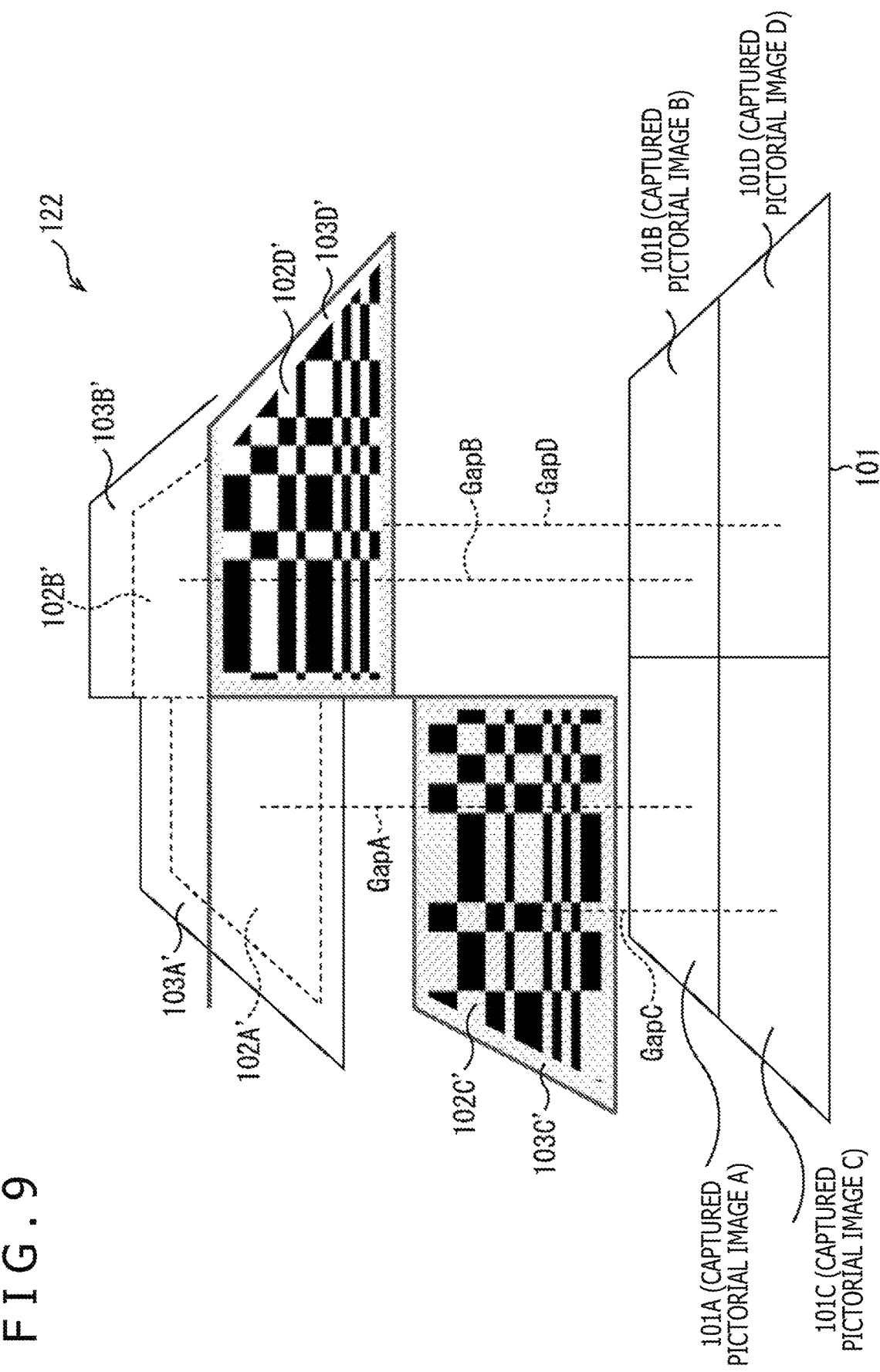
FIG. 9 is a diagram for explaining a configuration example of a second embodiment of the present disclosure.

FIG. 9 illustrates a configuration example of the image-capturing device 122 of the lensless image-capturing apparatus 111 in which the opening sections of the mask 102 are formed to have identical unit sizes Δ in all the areas, and the distance between the mask 102 and the solid-state image-capturing device 101 is varied for each area according to the wavelength band of incident light to reduce the influence of diffraction.

Note that configurations in FIG. 9 that have functions identical to those in FIG. 3 are given identical reference signs, and explanations thereof are omitted as appropriate. That is, a difference of FIG. 9 from FIG. 3 is that instead of the area 102A to the area 102D of the mask 102 and the areas 103A to 103D of the band-pass filter 103, areas 102A' to 102D' and areas 103A' to 103D' are set. In addition, although in FIG. 9 descriptions of mask patterns for the areas 102A' and 102B' are omitted, the omission is only for convenience of explanation, and mask patterns with identical unit sizes are actually provided to the areas 102A' to 102D'.

In FIG. 9, the distances between the areas 101A to 101D of the solid-state image-capturing device 101 and the areas 102A' to 102D' of the mask 102, respectively, are different from each other.

That is, in FIG. 9, the distance between the area 101A of the solid-state image-capturing device 101 and the area 102A' of the mask 102 is a distance GapA, the distance between the area 101B of the solid-state image-capturing device 101 and the area 102B' of the mask 102 is a distance GapB, the distance between the area 101C of the solid-state image-capturing device 101 and the area 102C' of the mask 102 is a distance GapC, the distance between the area 101D of the solid-state image-capturing device 101 and the area 102D' of the mask 102 is a distance GapD, and GapA to GapD are mutually different distances.

This is because the degree of the influence of diffraction can be adjusted by the distance between the mask 102 and the solid-state image-capturing device 101 according to the wavelength band of incident light.

Figure 10:
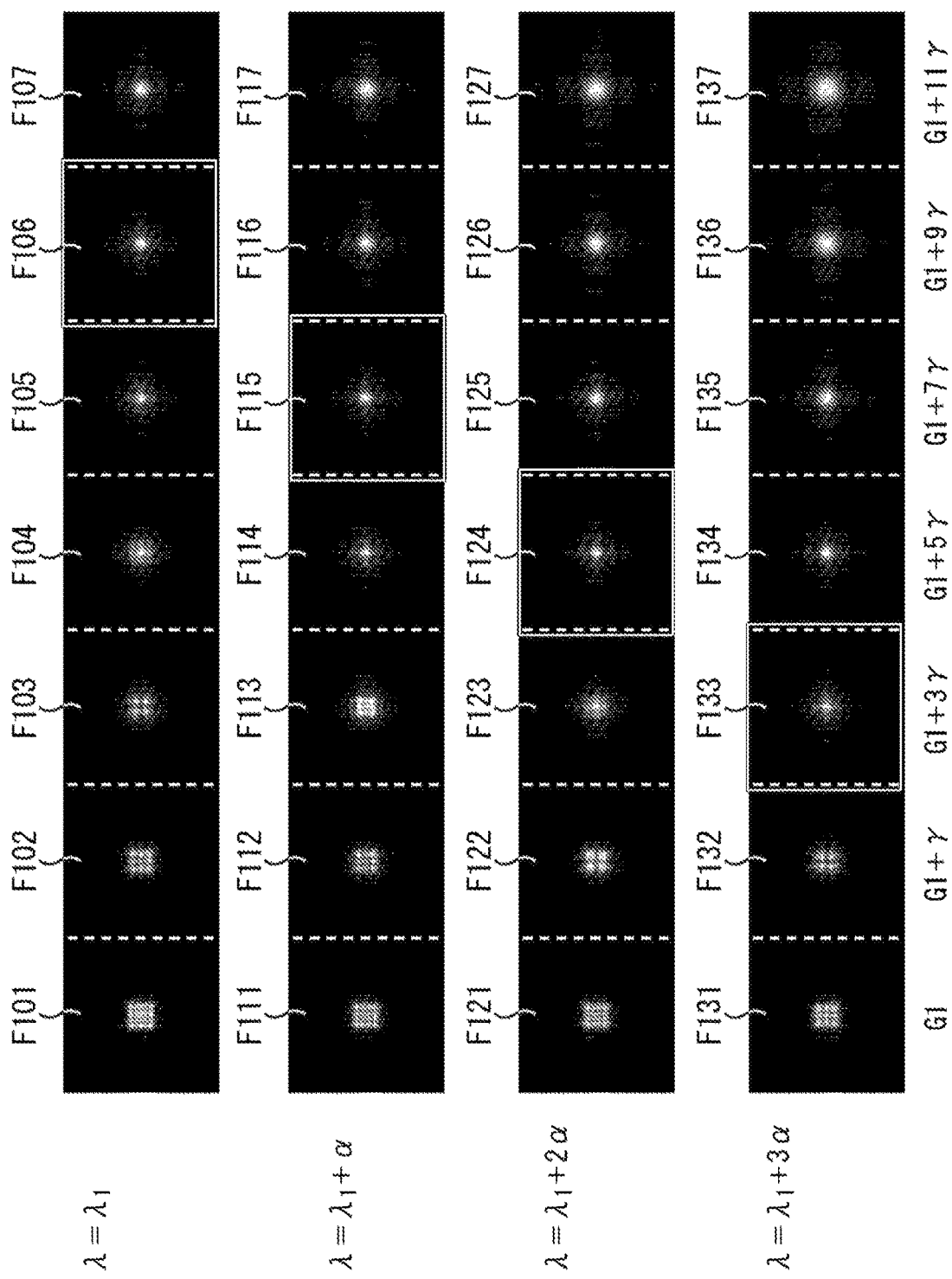
FIG. 10 is a diagram for explaining variations among pictorial images that are observed when modulated light is captured in cases that a distance from a mask to a solid-state image-capturing device and the wavelength of incident light are varied.

For example, in a case that the unit sizes Δ for adjusting the opening sections of the mask 102 are predetermined identical values for all the areas, and, as illustrated in the topmost line in FIG. 10, the wavelength of incident light is the wavelength λ1, when the distance between the mask 102 and the solid-state image-capturing device 101 is varied from G1 to G1+11γ, captured pictorial images of incident light passing through one opening section captured by the solid-state image-capturing device 101 vary as illustrated by captured pictorial images F101 to F108.

If diffraction occurs due to the opening section, incident-light pictorial images that are formed with the incident light do not become spot-like pictorial images on the image-capturing plane of the solid-state image-capturing device 101, but become pictorial images that present scattered and spreading light, and furthermore the magnitude of the spreading varies depending on the degree of the influence of diffraction.

That is, in the case of the topmost line in FIG. 10 that the wavelength of the incident light is the wavelength λ1, the pictorial image F106 (the distance between the mask 102 and the solid-state image-capturing device 101=G1+9γ) presents the brightest spot with the smallest diameter, and it can be considered that the influence of diffraction is minimized. In addition, at this time, as the distance between the mask 102 and the solid-state image-capturing device 101 decreases as illustrated by the pictorial images F105 to F101 or as the distance between the mask 102 and the solid-state image-capturing device 101 increases as illustrated by the pictorial image F107, the spots near the centers spread, and the influence of diffraction gradually increases.

In addition, as illustrated in the second line in FIG. 10, in the case that the wavelength of incident light is the wavelength λ1+α, when the distance between the mask 102 and the solid-state image-capturing device 101 is varied from G1 to G1+11γ, captured pictorial images of incident light passing through one opening section captured by the solid-state image-capturing device 101 vary as illustrated by the captured pictorial images F111 to F118.

That is, in the case of the second line in FIG. 10 that the wavelength of the incident light is the wavelength λ1+α, the captured pictorial image F115 (the distance between the mask 102 and the solid-state image-capturing device 101=G1+7γ) presents the brightest spot with the smallest diameter, and it can be considered that the influence of diffraction is minimized. In addition, at this time, as the distance between the mask 102 and the solid-state image-capturing device 101 decreases as illustrated by the captured pictorial images F114 to F111 or as the distance between the mask 102 and the solid-state image-capturing device 101 increases as illustrated by the captured pictorial images F116 and F117, the spots near the centers spread, and the influence of diffraction gradually increases.

Furthermore, as illustrated in the third line in FIG. 10, in the case that the wavelength of incident light is the wavelength $\lambda1+2\alpha$, when the distance between the mask 102 and the solid-state image-capturing device 101 is varied from G1 to G1+11γ, captured pictorial images of incident light passing through one opening section captured by the solid-state image-capturing device 101 vary as illustrated by captured pictorial images F121 to F128.

That is, in the case of the third line in FIG. 10 that the wavelength of the incident light is the wavelength $\lambda1+2\alpha$, the captured pictorial image F124 (the distance between the mask 102 and the solid-state image-capturing device 101=G1+5γ) presents the brightest spot with the smallest diameter, and it can be considered that the influence of diffraction is minimized. In addition, at this time, as the distance between the mask 102 and the solid-state image-capturing device 101 decreases as illustrated by the captured pictorial images F123 to F121 or as the distance between the mask 102 and the solid-state image-capturing device 101 increases as illustrated by the captured pictorial image F125 to F127, the spots near the centers spread, and the influence of diffraction gradually increases.

In addition, as illustrated in the fourth line in FIG. 10, in the case that the wavelength of incident light is the wavelength $\lambda1+3\alpha$, when the distance between the mask 102 and the solid-state image-capturing device 101 is varied from G1 to G1+11γ, captured pictorial images of incident light passing through one opening section captured by the solid-state image-capturing device 101 vary as illustrated by the captured pictorial images F131 to F138.

That is, in the case of the fourth line in FIG. 10 that the wavelength of the incident light is the wavelength $\lambda1+3\alpha$, the captured pictorial image F133 (the distance between the mask 102 and the solid-state image-capturing device 101=G1+3γ) presents the brightest spot with the smallest diameter, and it can be considered that the influence of diffraction is minimized. In addition, at this time, as the distance between the mask 102 and the solid-state image-capturing device 101 decreases as illustrated by the captured pictorial images F132 and F131 or as the distance between the mask 102 and the solid-state image-capturing device 101 increases as illustrated by the captured pictorial images F134 to F137, the spots near the centers spread, and the influence of diffraction gradually increases.

In view of this, in a case that each of the areas 103A' to 103D' of the band-pass filter 103 in FIG. 9 transmits light in a corresponding wavelength band of the wavelength bands ZA to ZD illustrated in FIG. 5, incident light can be modulated, and caused to enter the solid-state image-capturing device 101 in a state that diffraction occurring to light in the individual wavelength bands is minimized by setting the distances GapA to GapD of the areas 102A' to 102D' of the corresponding mask 102 and the areas 101A to 101D of the corresponding solid-state image-capturing device 101 to G1+9γ, G1+7γ, G1+5γ, and G1+3γ, respectively.

As a result, it becomes possible for the solid-state image-capturing device 101 to capture four captured pictorial images of the individual wavelength bands each with minimized influence of blurring due to diffraction.

Note that since the image-capturing process at the lensless image-capturing apparatus 111 by using the image-capturing device 122 having the configuration explained with reference to FIG. 9 is similar to the process explained with reference to the flowchart in FIG. 8, an explanation of the image-capturing process is omitted.

In addition, since it is only required that the band-pass filter 103, the mask 102, and the solid-state image-capturing device 101 have such configurations that the influence of diffraction is minimized according to wavelength bands to be transmitted, both unit sizes of the mask 102, and distances between the mask 102 and the solid-state image-capturing device 101 may be adjusted for the individual areas that transmit identical wavelength bands.

5. Third Embodiment

In the example explained above, each of the band-pass filter 103, the mask 102, and the solid-state image-capturing device 101 is divided into areas according to wavelength bands of light to be transmitted by the band-pass filter 103, the light is modulated by the mask 102 in the individual areas such that the influence of diffraction is minimized for the individual wavelength bands in the individual areas, and captured by the solid-state image-capturing device 101, a final pictorial image of each area is reconstructed from a captured pictorial image captured in the area, and the final pictorial images are synthesized into a single final pictorial image.

However, there is a fear that light in the different wavelength bands inevitably experiences color mixing near the boundaries between the individual areas, and there is a fear that the influence of diffraction cannot be reduced appropriately near the boundaries.

In view of this, it may be made possible to appropriately reduce the influence of diffraction for each wavelength-band area by preventing color mixing of light in different wavelength bands by providing light-blocking walls at the boundaries between the divided areas.

FIG. 11 illustrates a configuration example of the image-capturing device 122 of the lensless image-capturing apparatus 111 in which light-blocking walls are provided at the boundaries between divided areas. Note that configurations in FIG. 11 that have functions identical to those in FIG. 3 are given identical reference signs, and explanations thereof are omitted.

That is, a difference of FIG. 11 from the image-capturing device of the lensless image-capturing apparatus in FIG. 3 is that light-blocking walls 201-1 and 201-2 are provided at the boundaries between the areas 103A to 130D of the band-pass filter 103, between the areas 102A to 102D of the mask 102, and between the areas 101A to 101D of the solid-state image-capturing device 101.

By the light-blocking walls 201-1 and 201-2 being provided at the boundaries between the areas 103A to 130D of the band-pass filter 103, between the areas 102A to 102D of the mask 102, and between the areas 101A to 101D of the solid-state image-capturing device 101, it becomes possible to prevent color mixing due to light in adjacent wavelength bands near the boundaries between the individual areas, and it becomes possible to surely reduce the influence of diffraction in the individual areas.

As a result, it becomes possible with the incident light in a wavelength band in each area to capture a captured pictorial image while the influence of blurring due to diffraction is reduced, and accordingly the spatial resolutions of final pictorial images to be reconstructed on the basis of the captured pictorial images can be enhanced.

Note that in the present specification, a system means a set of a plurality of constituent elements (apparatuses, modules (parts), etc.), and it does not matter whether or not all the constituent elements are contained in a single housing. Accordingly, both a plurality of apparatuses that is housed in separate housings and connected via a network, and one apparatus in which a plurality of modules is housed in one housing are systems.

In addition, embodiments of the present disclosure are not limited to the embodiments mentioned above, and can be changed in various manners within the scope not deviating from the gist of the present disclosure.

Furthermore, each step explained in the flowchart mentioned above can be executed not only by one apparatus, but also by a plurality of apparatuses by being shared among the plurality of apparatuses.

In addition, in a case that one step includes a plurality of processes, the plurality of processes included in the one step can be executed not only by one apparatus, but also by a plurality of apparatuses by being shared among the plurality of apparatuses.

Note that the present disclosure can also have configurations like the following ones.

<1>
An image-capturing apparatus including:
a band-pass filter that is divided into a plurality of areas, each of which transmits incident light in a different wavelength band;
a mask that is divided corresponding to the plurality of areas, and modulates the incident light in the different wavelength bands that are each transmitted through a corresponding one of the plurality of areas of the band-pass filter;
a solid-state image-capturing device that has an image-capturing plane that is divided corresponding to the plurality of areas, and captures, as a two-dimensional pixel signal, the incident light modulated by the mask in each of the plurality of areas; and
a signal processing section that reconstructs, as a final pictorial image by signal processing, the two-dimensional pixel signals captured by the solid-state image-capturing device.

<2>
The image-capturing apparatus according to <1>, in which
the mask has a mask pattern having a unit size that is different for each of the plurality of areas.

<3>
The image-capturing apparatus according to <2>, in which
the mask pattern for each of the plurality of areas is a mask pattern having a different unit size that is based on the wavelength band of the incident light that is transmitted through the band-pass filter.

<4>
The image-capturing apparatus according to <2>, in which
the mask pattern for each of the plurality of areas is a mask pattern having such a unit size that when the incident light in the wavelength band that is transmitted through the band-pass filter is captured by the solid-state image-capturing device, spreading of the incident light due to diffraction is approximately minimized.

<5>
The image-capturing apparatus according to <1>, in which
a distance from the mask to the image-capturing plane of the solid-state image-capturing device differs for each of the plurality of areas.

<6>
The image-capturing apparatus according to <5>, in which
the distance from the mask to the image-capturing plane of the solid-state image-capturing device is a distance that differs on a basis of the wavelength band of the incident light that is transmitted through each of the plurality of areas of the band-pass filter.

<7>
The image-capturing apparatus according to <6>, in which
the distance from the mask to the image-capturing plane of the solid-state image-capturing device for each of the plurality of areas is such a distance that when the incident light in the wavelength band that is transmitted through the band-pass filter is captured by the solid-state image-capturing device, spreading of the incident light due to diffraction is approximately minimized.

<8>
The image-capturing apparatus according to <5>, in which
the mask has a mask pattern having identical unit sizes for all areas of the plurality of areas.

<9>
The image-capturing apparatus according to <1>, further including:
a light-blocking wall that blocks incident light from adjacent areas at a boundary between the plurality of areas of the band-pass filter, the mask, and the solid-state image-capturing device.

<10>
The image-capturing apparatus according to <1>, in which
the signal processing section includes:
a dividing section that divides a two-dimensional pixel signal captured by the solid-state image-capturing device in association with the plurality of areas;
a plurality of pictorial-image reconstructing sections that reconstructs, as a final pictorial image by signal processing, each of pixel signals obtained by dividing the two-dimensional pixel signal; and
a synthesizing section that synthesizes the final pictorial images reconstructed by the plurality of pictorial-image reconstructing sections.

<11>
The image-capturing apparatus according to <10>, in which
the synthesizing section synthesizes the final pictorial images reconstructed by the plurality of pictorial-image reconstructing sections by superimposing the final pictorial images.

<12>
The image-capturing apparatus according to <10>, in which,
by selecting one final pictorial image of the final pictorial images reconstructed by the plurality of pictorial-image reconstructing sections, the synthesizing section synthesizes the one final pictorial image.

<13>

The image-capturing apparatus according to <10>, in which the synthesizing section selects at least two final pictorial images of the final pictorial images reconstructed by the plurality of pictorial-image reconstructing sections, and synthesizes the selected at least two final pictorial images in such a manner that the selected at least two final pictorial images are superimposed.

<14>

The image-capturing apparatus according to <1>, in which a minute gap is formed in a direction of incidence of the incident light between the solid-state image-capturing device and the mask.

<15>

The image-capturing apparatus according to <1>, in which the image-capturing apparatus does not include a lens that focuses the incident light onto any of the band-pass filter, the mask, and the solid-state image-capturing device.

<16>

The image-capturing apparatus according to <1>, in which the wavelength bands of the incident light are approximately 8 µm to approximately 14 µm.

<17>

An image-capturing method of an image-capturing apparatus including a band-pass filter that is divided into a plurality of areas, each of which transmits incident light in a different wavelength band, a mask that is divided corresponding to the plurality of areas, and modulates the incident light in the different wavelength bands that are each transmitted through a corresponding one of the plurality of areas of the band-pass filter, and a solid-state image-capturing device that has an image-capturing plane that is divided corresponding to the plurality of areas, and captures, as a two-dimensional pixel signal, the incident light modulated by the mask in each of the plurality of areas, the image-capturing method including:

signal processing of reconstructing, as a final pictorial image by signal processing, the two-dimensional pixel signals captured by the solid-state image-capturing device.

<18>

An image-capturing device including:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter; and a solid-state image-capturing device that has an image-capturing plane that is divided corresponding to the plurality of areas, and captures, as a two-dimensional pixel signal, the incident light modulated by the mask in each of the plurality of areas.

REFERENCE SIGNS LIST

101 Solid-state image-capturing device, 101A to 101D, 101A' to 101D' Area, 102 Mask, 102A to 102D, 102A' to 102D' Area, 103 Band-pass filter, 103A to 103D, 103A' to 103D' Area, 111 Lensless image-capturing apparatus, 121 Control section, 122 Image-capturing device, 123 Signal processing section, 124 Display section, 125 Storage section, 131 Signal area dividing section, 132 Pictorial-image reconstructing section, 133 Pictorial-image synthesizing section, 151A to 151D Pictorial-image reconstruction processing section

The invention claimed is:

1. An image-capturing apparatus comprising:
a band-pass filter that is divided into a plurality of areas, each of which transmits incident light in a different wavelength band;
a mask that is divided corresponding to the plurality of areas, and modulates the incident light in the different wavelength bands that are each transmitted through a corresponding one of the plurality of areas of the band-pass filter;
a solid-state image-capturing device that has an image-capturing plane that is divided corresponding to the plurality of areas, and captures, as a two-dimensional pixel signal, the incident light modulated by the mask in each of the plurality of areas; and
a signal processing section configured to reconstruct, as a final pictorial image by signal processing, the two-dimensional pixel signals captured by the solid-state image-capturing device,
wherein a mask pattern for each of the plurality of areas is a mask pattern having such a unit size that when the incident light in the wavelength band that is transmitted through the band-pass filter is captured by the solid-state image-capturing device, spreading of the incident light due to diffraction is approximately minimized, and
wherein the signal processing section is implemented via at least one processor.

2. The image-capturing apparatus according to claim 1, wherein
the mask pattern has a unit size that is different for each of the plurality of areas.

3. The image-capturing apparatus according to claim 2, wherein
the mask pattern for each of the plurality of areas is a mask pattern having a different unit size that is based on the wavelength band of the incident light that is transmitted through the band-pass filter.

4. The image-capturing apparatus according to claim 1, wherein
a distance from the mask to the image-capturing plane of the solid-state image-capturing device differs for each of the plurality of areas.

5. The image-capturing apparatus according to claim 4, wherein
the distance from the mask to the image-capturing plane of the solid-state image-capturing device is a distance that differs on a basis of the wavelength band of the incident light that is transmitted through each of the plurality of areas of the band-pass filter.

6. An image-capturing apparatus comprising:
a band-pass filter that is divided into a plurality of areas, each of which transmits incident light in a different wavelength band;
a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas; and a signal processing section configured to reconstruct, as a final pictorial image by signal processing, the two-dimensional pixel signals captured by the solid-state image-capturing device, wherein a distance from the mask to the image-capturing plane of the solid-state image-capturing device differs for each of the plurality of areas, the distance from the mask to the image-capturing plane of the solid-state image-capturing device is a distance that differs on a basis of the wavelength band of the incident light that is transmitted through each of the plurality of areas of the band-pass filter, and the distance from the mask to the image-capturing plane of the solid-state image-capturing device for each of the plurality of areas is such a distance that when the incident light in the wavelength band that is transmitted through the band-pass filter is captured by the solid-state image-capturing device, spreading of the incident light due to diffraction is approximately minimized.

7. An image-capturing apparatus comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas; and a signal processing section configured to reconstruct, as a final pictorial image by signal processing, the two-dimensional pixel signals captured by the solid-state image-capturing device, wherein a distance from the mask to the image-capturing plane of the solid-state image-capturing device differs for each of the plurality of areas, and the mask has a mask pattern having identical unit sizes for all areas of the plurality of areas.

8. An image-capturing apparatus comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas;

a signal processing section configured to reconstruct, as a final pictorial image by signal processing, the two-dimensional pixel signals captured by the solid-state image-capturing device; and a light-blocking wall that blocks incident light from adjacent areas at a boundary between the plurality of areas of the band-pass filter, the mask, and the solid-state image-capturing device.

9. An image-capturing apparatus comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas; and a signal processing section configured to reconstruct, as a final pictorial image by signal processing, the two-dimensional pixel signals captured by the solid-state image-capturing device, wherein the signal processing section includes:

a dividing section configured to divide a two-dimensional pixel signal captured by the solid-state image-capturing device in association with the plurality of areas;

a plurality of pictorial-image reconstructing sections configured to reconstruct, as a final pictorial image by signal processing, each of pixel signals obtained by dividing the two-dimensional pixel signal; and a synthesizing section configured to synthesize the final pictorial images reconstructed by the plurality of pictorial-image reconstructing sections.

10. The image-capturing apparatus according to claim 9, wherein the synthesizing section is further configured to synthesize the final pictorial images reconstructed by the plurality of pictorial-image reconstructing sections by superimposing the final pictorial images.

11. The image-capturing apparatus according to claim 9, wherein, by selecting one final pictorial image of the final pictorial images reconstructed by the plurality of pictorial-image reconstructing sections, the synthesizing section is further configured to synthesize the one final pictorial image.

12. The image-capturing apparatus according to claim 9, wherein the synthesizing section is further configured to select at least two final pictorial images of the final pictorial images reconstructed by the plurality of pictorial-image reconstructing sections, and synthesize the selected at least two final pictorial images in such a manner that the selected at least two final pictorial images are superimposed.

13. The image-capturing apparatus according to claim 1, wherein a minute gap is formed in a direction of incidence of the incident light between the solid-state image-capturing device and the mask.

14. An image-capturing apparatus comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas; and a signal processing section configured to reconstruct, as a final pictorial image by signal processing, the two-dimensional pixel signals captured by the solid-state image-capturing device, wherein the image-capturing apparatus does not include a lens that focuses the incident light onto any of the band-pass filter, the mask, and the solid-state image-capturing device.

15. An image-capturing apparatus comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter;

a solid-state image-capturing device that has an image-capturing plane that is divided corresponding to the plurality of areas, and captures, as a two-dimensional pixel signal, the incident light modulated by the mask in each of the plurality of areas; and a signal processing section configured to reconstruct, as a final pictorial image by signal processing, the two-dimensional pixel signals captured by the solid-state image-capturing device, wherein the wavelength bands of the incident light are approximately 8 μm to approximately 14 μm.

16. An image-capturing method of an image-capturing apparatus including a band-pass filter that is divided into a plurality of areas, each of which transmits incident light in a different wavelength band, a mask that is divided corresponding to the plurality of areas, and modulates the incident light in the different wavelength bands that are each transmitted through a corresponding one of the plurality of areas of the band-pass filter, and a solid-state image-capturing device that has an image-capturing plane that is divided corresponding to the plurality of areas, and captures, as a two-dimensional pixel signal, the incident light modulated by the mask in each of the plurality of areas, the image-capturing method comprising:

signal processing of reconstructing, as a final pictorial image by signal processing, the two-dimensional pixel signals captured by the solid-state image-capturing device, wherein a mask pattern for each of the plurality of areas is a mask pattern having such a unit size that when the incident light in the wavelength band that is transmitted through the band-pass filter is captured by the solid-state image-capturing device, spreading of the incident light due to diffraction is approximately minimized.

17. An image-capturing device comprising:

a band-pass filter that is divided into a plurality of areas, each of which transmits incident light in a different wavelength band;

a mask that is divided corresponding to the plurality of areas, and modulates the incident light in the different wavelength bands that are each transmitted through a corresponding one of the plurality of areas of the band-pass filter; and a solid-state image-capturing device that has an image-capturing plane that is divided corresponding to the plurality of areas, and captures, as a two-dimensional pixel signal, the incident light modulated by the mask in each of the plurality of areas, wherein a mask pattern for each of the plurality of areas is a mask pattern having such a unit size that when the incident light in the wavelength band that is transmitted through the band-pass filter is captured by the solid-state image-capturing device, spreading of the incident light due to diffraction is approximately minimized.

* * * * *